US012730369B2

(12) United States Patent
Hatano et al.

(10) Patent No.: US 12,730,369 B2
(45) Date of Patent: Sep. 8, 2026

(54) PROJECTOR

(71) Applicant: SEIKO EPSON CORPORATION, Tokyo (JP)

(72) Inventors: Kana Hatano, Matsumoto (JP); Eiji Morikuni, Matsumoto (JP); Akira Shinbo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 217 days.

(21) Appl. No.: 18/393,817

(22) Filed: Dec. 22, 2023

(65) Prior Publication Data

US 2024/0210808 A1 Jun. 27, 2024

(30) Foreign Application Priority Data

Dec. 26, 2022 (JP) ................................ 2022-208143

(51) Int. Cl.
*G03B 21/20* (2006.01)
*G02B 27/30* (2006.01)

(52) U.S. Cl.
CPC ....... *G03B 21/208* (2013.01); *G03B 21/2073* (2013.01)

(58) Field of Classification Search
CPC ... G03B 21/208; G03B 21/2033; G02B 27/30
See application file for complete search history.

(56) References Cited

U.S. PATENT DOCUMENTS 7,901,097 B2 3/2011 Hirata et al.
2006/0274273 A1* 12/2006 Mihalakis ............ G03B 21/008 353/20
2013/0021890 A1* 1/2013 Oberg .................. G11B 7/1376
2014/0204592 A1* 7/2014 Miyashita .......... G02B 19/0028 362/311.06

FOREIGN PATENT DOCUMENTS

| | | | | |
|---|---|---|---|---|
| CN | 201622432 | | 11/2010 | |
| CN | 212515320 | | 2/2021 | |
| CN | 114442203 | A * | 5/2022 | ............. G02B 27/30 |
| JP | 2002062584 | A | 2/2002 | |
| JP | 2003-121930 | A | 4/2003 | |
| JP | 20033255272 | A | 9/2003 | |
| JP | 2004279507 | A | 10/2004 | |
| JP | 2008-209811 | A | 9/2008 | |
| JP | 2009015102 | A | 1/2009 | |

* cited by examiner

*Primary Examiner* — Ryan D Howard

(74) *Attorney, Agent, or Firm* — Dority and Manning, P.A.

(57) ABSTRACT

A projector includes a light source, a Fresnel lens group parallelizing the beam output from the light source, a light-incident-side polarizer transmitting the beam having exited out of the Fresnel lens group, a light modulator modulating the beam having passed through the light-incident-side polarizer to form a projection image, a light-exiting-side polarizer transmitting the beam modulated by the light modulator, and a projection lens projecting the beam having passed through the light-exiting-side polarizer. The Fresnel lens group includes a first Fresnel lens having positive power and disposed at a position closest to the light source in the Fresnel lens group, and a second Fresnel lens having positive power and disposed at a position shifted from the first Fresnel lens toward the light modulator. The light incident surface of the first Fresnel lens has a Fresnel surface. The light exiting surface of the first Fresnel lens has no Fresnel surface.

14 Claims, 14 Drawing Sheets

S
1
3
14
13,130
4
2
12
222,224
221,223
20
22
21
212,214
211,213
11
10
N
+Z
-Z
+Y
-Y
-X

S
3
100
14
13,130
4
12
2
60
602,604
601,603
11
10
N
+Z
-Z
+Y
-Y
-X

S
1A
3
4
14
13,130
12
2
222,223
221,224
22
20
21
212,214
211,213
11
10
N
+Z
-Z
+Y
-Y
-X

S
3
1B
14
13,130
4
12
2
222,223
221,224
22
20
21
212,214
211,213
11
10
N
+Z
-X
+Y
-Y
-Z

S
3
1C
14
13,130
4
12
2
232,234
231,233
20
23
22
21
222,224
221,223
212,214
211,213
11
10
N
+Y
-Y
+Z
-Z
-X

S
3
1E
4
14
13,130
12
222,224
221,223
22
20
21
212,214
211,213
2
18
15,150
17
16
11
11
10
N
+Z
-Y
+X
-X
-Z

S
3
1F
4
14
13,130
12
2
222,224
221,223
22
20
21
212,214
211,213
X-POLARIZED LIGHT
X-POLARIZED LIGHT
18
15
153
152
151
Y-POLARIZED LIGHT
11
11
10
N
+X
-X
+Z
-Z
-Y

S
3
1G
14
13,130
4
12
2
74
73
72
75
70
71
20
22
21
211,213
212,214
221,223
222,224
11
10
N
+Z
-Z
+Y
-Y
-X

PROJECTOR

The present application is based on, and claims priority from JP Application Serial Number 2022-208143, filed Dec. 26, 2022, the disclosure of which is hereby incorporated by reference herein in its entirety.

BACKGROUND

1. Technical Field

The present disclosure relates to a projector.

2. Related Art

A projector that parallelizes the beam from a light source by using a Fresnel lens is described in Chinese Utility Model Registration No. 201, 622, 432. The projector described in Chinese Utility Model Registration No. 201, 622, 432 includes a light source, a single Fresnel lens on which the beam from the light source is incident, a light-incident-side polarizer that transmits the beam having exited out of the Fresnel lens, a liquid crystal panel that modulates the beam having exited out of the light-incident-side polarizer to form a projection image, a light-exiting-side polarizer that transmits the beam output from the liquid crystal panel, and a projection lens that enlarges the beam having exited out of the light-exiting-side polarizer. The Fresnel lens parallelizes the beam from the light source. The light-incident-side polarizer does not transmit the light component polarized along the absorption axis of the light-incident-side polarizer out of the beam having exited out of the Fresnel lens. The liquid crystal panel modulates the polarized light component having passed through the light-incident-side polarizer.

Chinese Utility Model Registration No. 201,622,432 is an example of the related art.

The beam distribution of the beam incident on the Fresnel lens, which has a curved surface that is concentrically divided, has a circular shape. However, since the transmittance of the Fresnel lens that transmits the beam varies in accordance with the polarization direction of the beam incident on the Fresnel lens and the angle of incidence of the beam, the distribution of the beam having exited out of the Fresnel lens and the light-incident-side polarizer has an elliptical shape. Since the elliptical beam having passed through the light-incident-side polarizer therefore impinges on the liquid crystal panel, there is a problem of a dark peripheral portion of the projection image formed by the liquid crystal panel.

SUMMARY

To solve the problem described above, a projector according to an aspect of the present disclosure includes a light source, a Fresnel lens group that parallelizes a beam output from the light source, a light-incident-side polarizer that transmits the beam that exits out of the Fresnel lens group, a light modulator that modulates the beam passing through the light-incident-side polarizer to form a projection image, a light-exiting-side polarizer that transmits the beam modulated by the light modulator, and a projection lens that projects the beam passing through the light-exiting-side polarizer. The Fresnel lens group includes a first Fresnel lens having positive power and disposed at a position closest to the light source in the Fresnel lens group, and a second Fresnel lens having positive power and disposed at a position shifted from the first Fresnel lens toward the light modulator. A light incident surface of the first Fresnel lens has a Fresnel surface. A light exiting surface of the first Fresnel lens does not have a Fresnel surface.

DESCRIPTION OF EMBODIMENTS

Projectors according to embodiments of the present disclosure will be described below with reference to the drawings.

Embodiment 1

Figure 1:
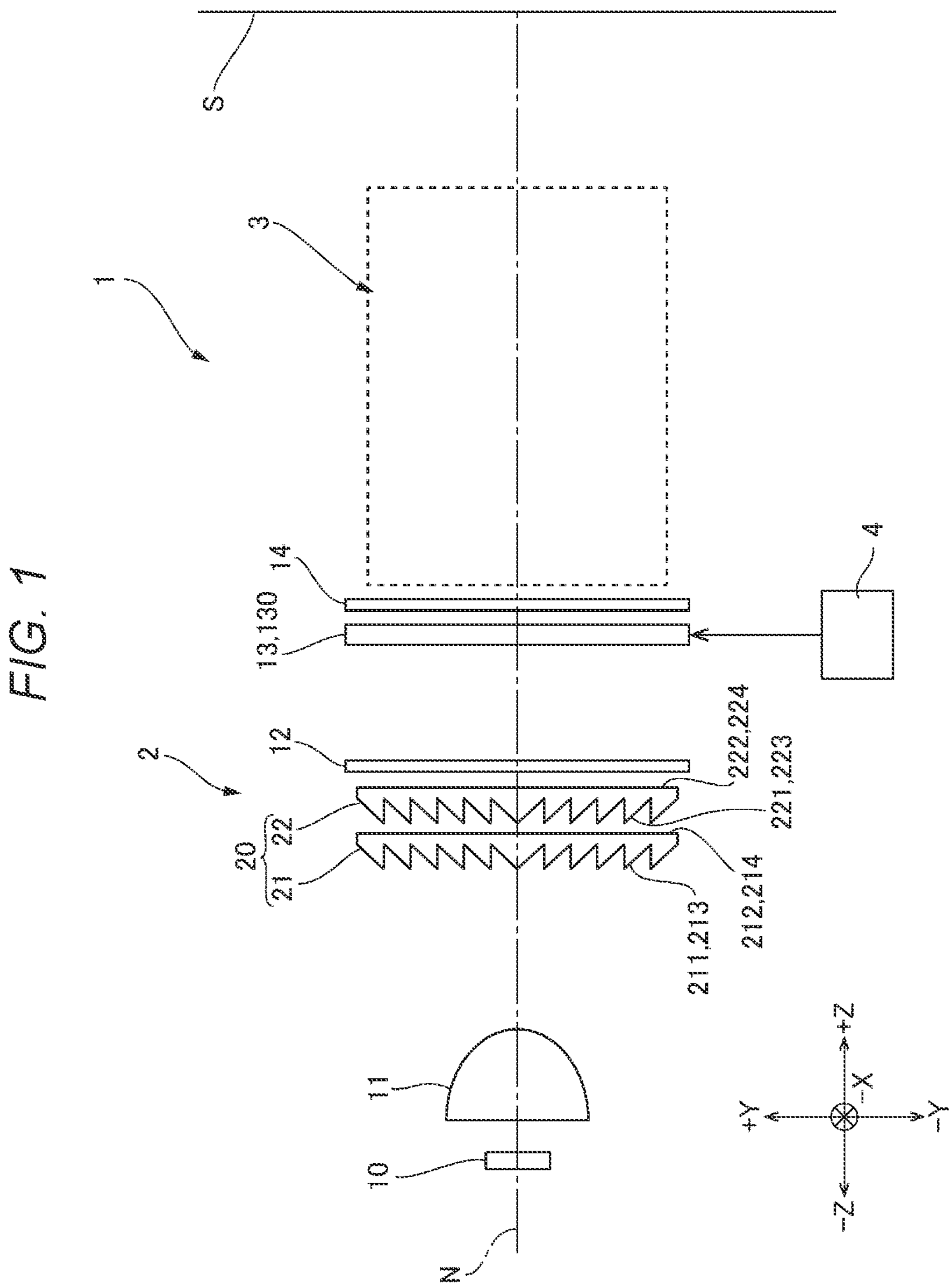
FIG. 1 is a schematic view of key parts of a projector according to Embodiment 1.

FIG. 1 is a schematic view of key parts of the projector according to Embodiment 1. A projector 1 includes an image formation unit 2, which generates a projection image to be projected onto a screen S, a projection lens 3, which enlarges the projection image and projects the enlarged projection image onto the screen S, and a controller 4, which controls the operation of the image formation unit 2, as shown in FIG. 1.

The image formation unit 2 includes a light source 10, a pickup lens 11, a Fresnel lens group 20, a light-incident-side polarizer 12, a light modulator 13, and a light-exiting-side polarizer 14. The light source 10, the pickup lens 11, the Fresnel lens group 20, the light-incident-side polarizer 12, the light modulator 13, and the light-exiting-side polarizer 14 are arranged along an optical axis N. The light source 10 is formed, for example, of an ultrahigh-pressure mercury lamp or a solid-state light source. In the present embodiment, the light source 10 is an LED that emits white randomly polarized light. The pickup lens 11 guides the beam output from the light source 10 to the Fresnel lens group 20. In the following description, three axes perpendicular to one another are called an X-axis, a Y-axis, and a Z-axis for convenience. The direction which extends along the optical axis N of the Fresnel lens group 20 and in which the beam from the light source 10 enters and exits out of the Fresnel lens group 20 is called a direction Z toward the positive end thereof. In the present embodiment, the light component polarized along the direction of the X-axis may be referred to as X-polarized light, and the light component polarized along the direction of the Y-axis may be referred to as Y-polarized light.

The Fresnel lens group 20 parallelizes the beam output from the light source 10. The light-incident-side polarizer 12 is disposed between the Fresnel lens group 20 and the light modulator 13. The light-incident-side polarizer 12 transmits the beam containing a light component polarized in a direction that intersects with the absorption axis of the light-incident-side polarizer 12 out of the polarized light components contained in the beam having exited out of the Fresnel lens group 20. In the present embodiment, the light-incident-side polarizer 12 transmits the beam containing a light component polarized along the direction of the X-axis out of the polarized light components contained in the beam having exited out of the Fresnel lens group 20.

The light modulator 13 modulates the light component having passed through the light-incident-side polarizer 12 and polarized along the direction of the X-axis to form a projection image. The light modulator 13 is a liquid crystal panel 130. In the present embodiment, the liquid crystal panel 130 is formed of a single panel having pixels formed of a plurality of sub-pixels that modulate beams having three different colors, and forms a color projection image. That is, the projector 1 according to the present embodiment is a single-panel projector.

The light-exiting-side polarizer 14 transmits the beam containing a light component polarized along one of the direction of the X-axis and the direction of the Y-axis out of the polarized light components contained in the beam output from the liquid crystal panel 130. In the present embodiment, the light-exiting-side polarizer 14 transmits the beam containing the light component polarized along the direction of the Y-axis out of the polarized light components contained in the beam output from the liquid crystal panel 130.

The projection lens 3 projects the beam having passed through the light-exiting-side polarizer 14 onto the screen S. The projection lens 3 includes a plurality of lenses. The controller 4 operates the liquid crystal panel 130 based on an external image signal, such as a video signal.

Fresnel Lens Group

The Fresnel lens group 20 includes a plurality of Fresnel lenses. In the present embodiment, the Fresnel lens group 20 includes a first Fresnel lens 21 disposed at the side facing the light source 10, and a second Fresnel lens 22 disposed at a position shifted from the first Fresnel lens 21 toward the liquid crystal panel 130. The Fresnel lens in the present embodiment is a Fresnel lens having a curved surface that is concentrically divided.

The first Fresnel lens 21 is made of resin. The first Fresnel lens 21 has positive power. A light incident surface 211 of the first Fresnel lens 21 has a Fresnel surface 213. A light exiting surface 212 of the first Fresnel lens 21 has a planar surface 214. That is, the light exiting surface 212 of the first Fresnel lens 21 does not have a Fresnel surface.

The second Fresnel lens 22 is made of resin. The second Fresnel lens 22 has positive power. A light incident surface 221 of the second Fresnel lens 22 has a Fresnel surface 223. A light exiting surface 222 of the second Fresnel lens 22 has a planar surface 224. That is, the light exiting surface 222 of the second Fresnel lens 22 does not have a Fresnel surface.

Characteristics of Fresnel Lens

Figure 2:
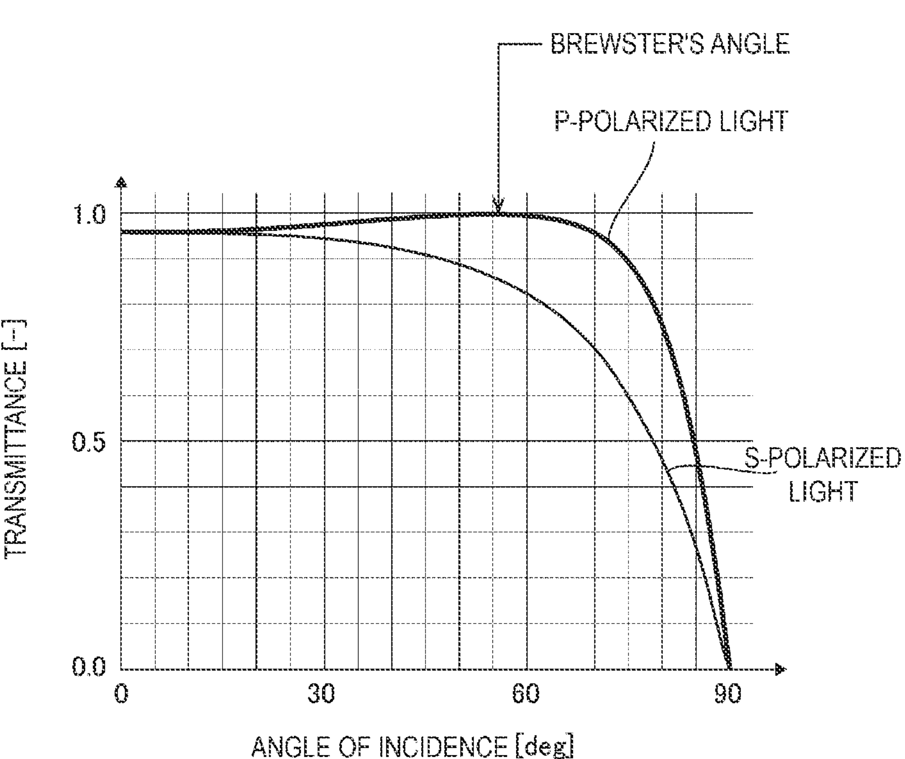
FIG. 2 shows the relationship between the angle of incidence and transmittance.
Figure 3:
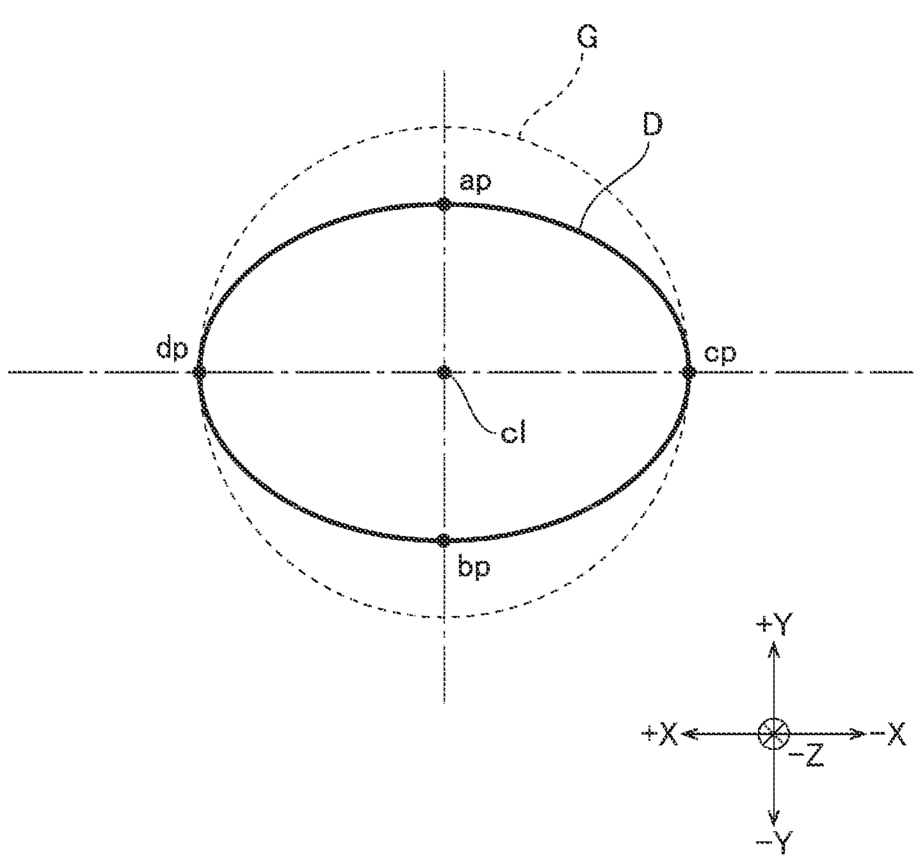
FIG. 3 describes the shape of the distribution of a beam containing a light component polarized along the direction of an X-axis after the beam exits out of a Fresnel lens.
Figure 4:
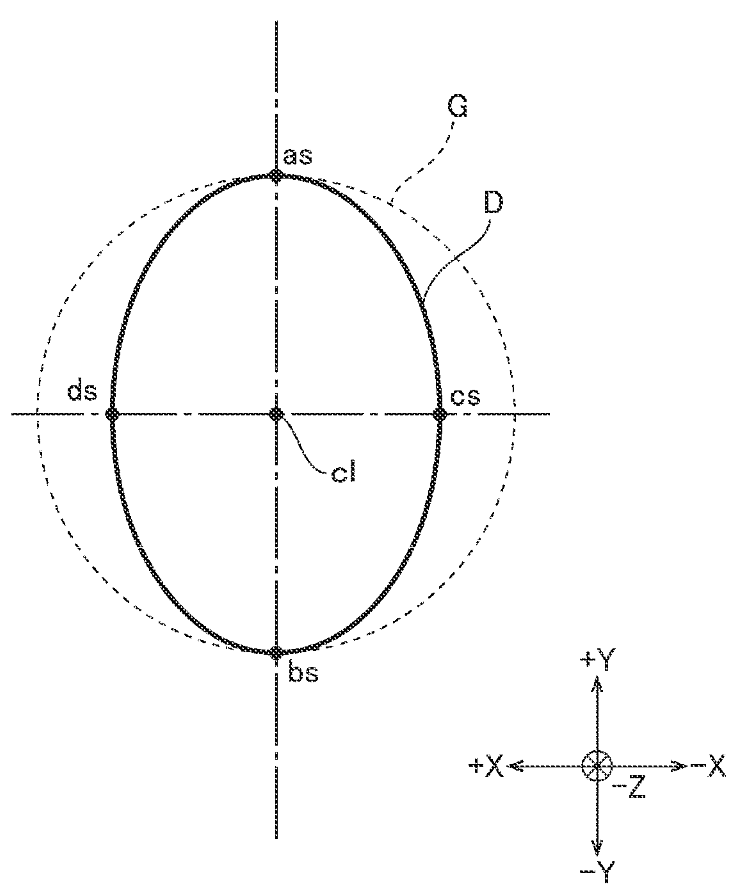
FIG. 4 describes the shape of the distribution of a beam containing a light component polarized along the direction of a Y-axis after the beam exits out of the Fresnel lens.
Figure 5:
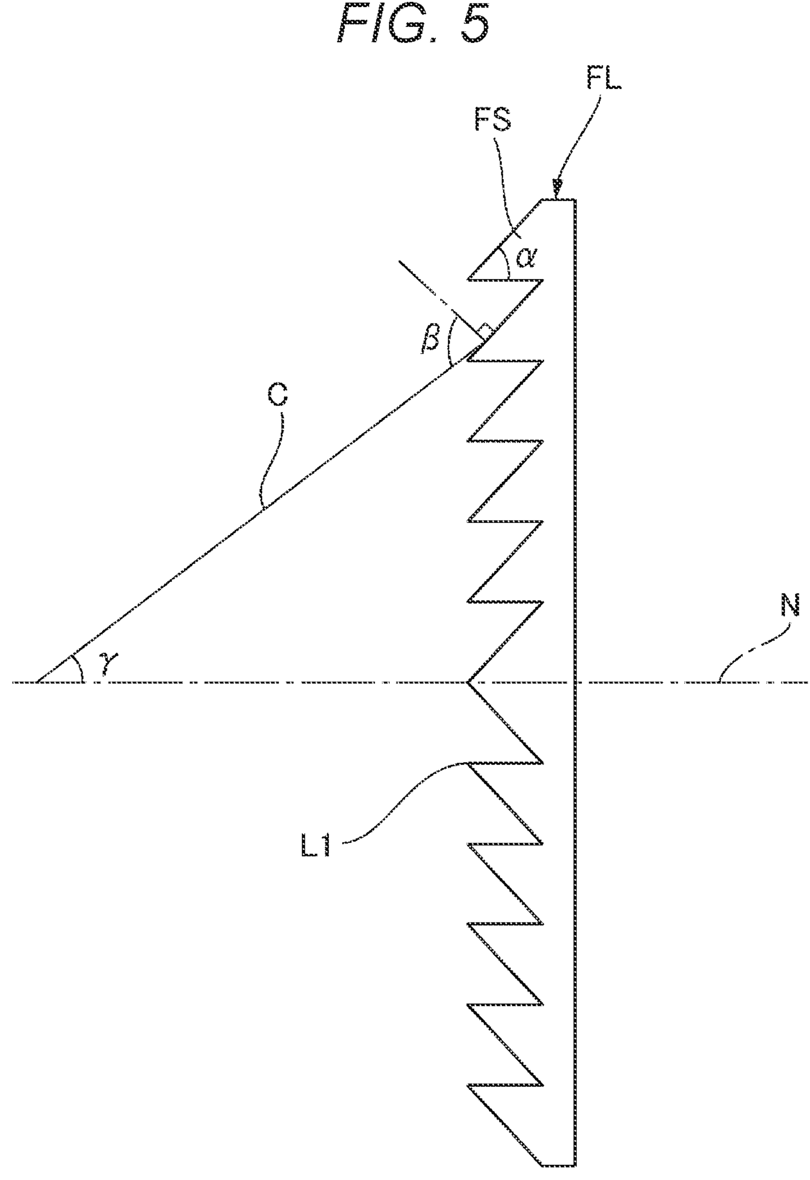
FIG. 5 describes a Fresnel shape.

The characteristics of a Fresnel lens will be described. FIG. 2 shows the relationship between the angle of incidence and transmittance. FIG. 3 describes the shape of the distribution of the beam containing the light component polarized along the direction of the X-axis after the beam enters the Fresnel lens and then exits out thereof. FIG. 4 describes the shape of the distribution of the beam containing the light component polarized along the direction of the Y-axis after the beam enters the Fresnel lens and then exits out thereof. FIG. 5 describes a Fresnel shape.

As compared with the amount of P-polarized beam passing through an optical material, the amount of S-polarized beam passing through the optical material significantly decreases as the angle of incidence of the beam increases, as shown in FIG. 2. Therefore, up to Brewster's angle, the difference between the amount of P-polarized beam and the amount of S-polarized beam increases as the angle of incidence of the beam increases. FIG. 2 shows the relationship between the angle of incidence and the transmittance of quartz glass, and the difference between the amount of P-polarized beam and the amount of S-polarized beam increases as the angle of incidence of the beam increases up to Brewster's angle irrespective of the optical material.

FIG. 3 shows how the beam passes through the Fresnel lens as will be described below. The beam passing through the concentric Fresnel lens follows the P-polarization direction in the plane XY at the outer periphery of the Fresnel lens on opposite sides of the direction of the X-axis, which intersects with the optical axis N of the Fresnel lens. The beam passing through the concentric Fresnel lens follows the S-polarization direction in the plane XY at the outer periphery of the Fresnel lens on opposite sides of the direction of the Y-axis, which intersects with the optical axis N of the Fresnel lens. Therefore, in the case of the X-polarized light, the difference between the amount of P-polarized beam passing through the outer periphery of the Fresnel lens on opposite sides of the direction of the X-axis, which intersects with the optical axis N of the Fresnel lens, and the amount of S-polarized beam passing through the outer periphery of the Fresnel lens on opposite sides of the direction of the Y-axis, which intersects with the optical axis N of the Fresnel lens, increases as the angle of incidence of the beam increases. As a result, when the positive power of the Fresnel lens increases, the angle of incidence of the beam passing through the outer periphery of the Fresnel lens also increases, so that the distribution of the beam having exited out of the Fresnel lens and containing the light component polarized along the direction of the X-axis changes from a circular shape G to an elliptical shape D, as shown in FIG. 3.

FIG. 4 shows how the beam passes through the Fresnel lens as will be described below. The beam passing through the concentric Fresnel lens follows the P-polarization direction in the plane XY at the outer periphery of the Fresnel lens on opposite sides of the direction of the Y-axis, which intersects with the optical axis N of the Fresnel lens. The beam passing through the concentric Fresnel lens follows the S-polarization direction in the plane XY at the outer periphery of the Fresnel lens on opposite sides of the direction of the X-axis, which intersects with the optical axis N of the Fresnel lens. Therefore, in the case of the Y-polarized light, the difference between the amount of P-polarized beam passing through the outer periphery of the Fresnel lens on opposite sides of the direction of the Y-axis, which intersects with the optical axis N of the Fresnel lens, and the amount of S-polarized beam passing through the outer periphery of the Fresnel lens on opposite sides of the direction of the X-axis, which intersects with the optical axis N of the Fresnel lens, increases as the angle of incidence of the beam increases. As a result, when the positive power of the Fresnel lens increases, the angle of incidence of the beam passing through the outer periphery of the Fresnel lens also increases, so that the distribution of the beam having exited out of the Fresnel lens and containing the light component polarized along the direction of the Y-axis changes from the circular shape G to the elliptical shape D, as shown in FIG. 4.

The greater the positive power of a Fresnel lens FL, the smaller an angle $\alpha$ of a Fresnel shape FS of a Fresnel surface L1, as shown in FIG. 5. Therefore, as the positive power of the Fresnel lens FL increases, an angle $\gamma$ of a beam C incident on the Fresnel surface L1 increases at the outer periphery of the Fresnel lens FL, so that an angle of incidence $\beta$ of the beam C incident on the Fresnel surface L1 increases. Therefore, when the light incident surface of the Fresnel lens FL has the Fresnel shape FS, the beam distributions of the X-polarized light and the Y-polarized light of the beam having exited out of the Fresnel lens tend to have a more elliptical shape, as the positive power of the Fresnel lens increases.

Fresnel Lens Evaluation Formula

Based on the characteristics of a Fresnel lens, the beam distribution of the beam having exited out of the Fresnel lens can be evaluated by the following evaluation formula:

$$E=1/(4I\max)\times(|Iap-Ias|+|Ibp-Ibs|+|Icp-Ics|+|Idp-Ids|) \quad (1)$$

The evaluation value E calculated by the evaluation formula (1) described above is a value indicating how much the circular distribution of the beam incident on the Fresnel lens changes, when the beam exits out of the Fresnel lens, in an evaluation plane set at a fixed position separate from the light source. According to the evaluation formula (1), the smaller the difference in the amount of light passing through the Fresnel lens between the X-polarized light and the Y-polarized light, the smaller the evaluation value E. That is, the smaller the evaluation value E, the closer the distribution of the beam having exited out of the Fresnel lens to a circular shape, whereas the greater the evaluation value E, the closer the distribution of the beam having exited out of the Fresnel lens to an elliptical shape.

In the evaluation formula (1) described above, Imax represents the illuminance of each of the P-polarized light and the S-polarized light at a center position cl in FIGS. 3 and 4, and the illuminance of the polarized light component along the direction of the X-axis (X-polarized light) and the illuminance of the polarized light component along the direction of the Y-axis (Y-polarized light) have the same value. Iap represents the illuminance of the X-polarized light at a boundary position ap on the minor axis (facing positive end of Y-axis) in FIG. 3. Ibp represents the illuminance of the X-polarized light at a boundary position bp on the minor axis (facing negative end of Y-axis) in FIG. 3. Icp represents the illuminance of the X-polarized light at a boundary position cp on the major axis (facing negative end of X-axis) in FIG. 3. Idp represents the illuminance of the X-polarized light at a boundary position dp on the major axis (facing positive end of X-axis) in FIG. 3. Ias represents the illuminance of the Y-polarized light at a boundary position as on the major axis (facing positive end of Y-axis) in FIG. 4. Ibs represents the illuminance of the Y-polarized light at a boundary position bs on the major axis (facing negative end of Y-axis) in FIG. 4. Ics represents the illuminance of the Y-polarized light at a boundary position cs on the minor axis (facing negative end of X-axis) in FIG. 4. Ids represents the illuminance of the Y-polarized light at a boundary position ds on the minor axis (facing positive end of X-axis) in FIG. 4. Note that the distances from the boundary positions ap, bp, as, and bs to the center position cl are equal to each other. Further note that the distances from the boundary positions cp, dp, cs, and ds to the center position cl are equal to each other.

Comparison Between Embodiment 1 and Comparative Example

The beam distribution of the beam having exited out of the Fresnel lens group 20 in the projector 1 according to Embodiment 1 and the beam distribution of the beam having exited out of a Fresnel lens in a projector according to Comparative Example were compared with each other by using the evaluation formula (1) described above. The variety of kinds of illuminance used in the evaluation formula (1) were each calculated by using simulation software. LightTools available from Synopsys, Inc. was used as the simulation software.

Figure 6:
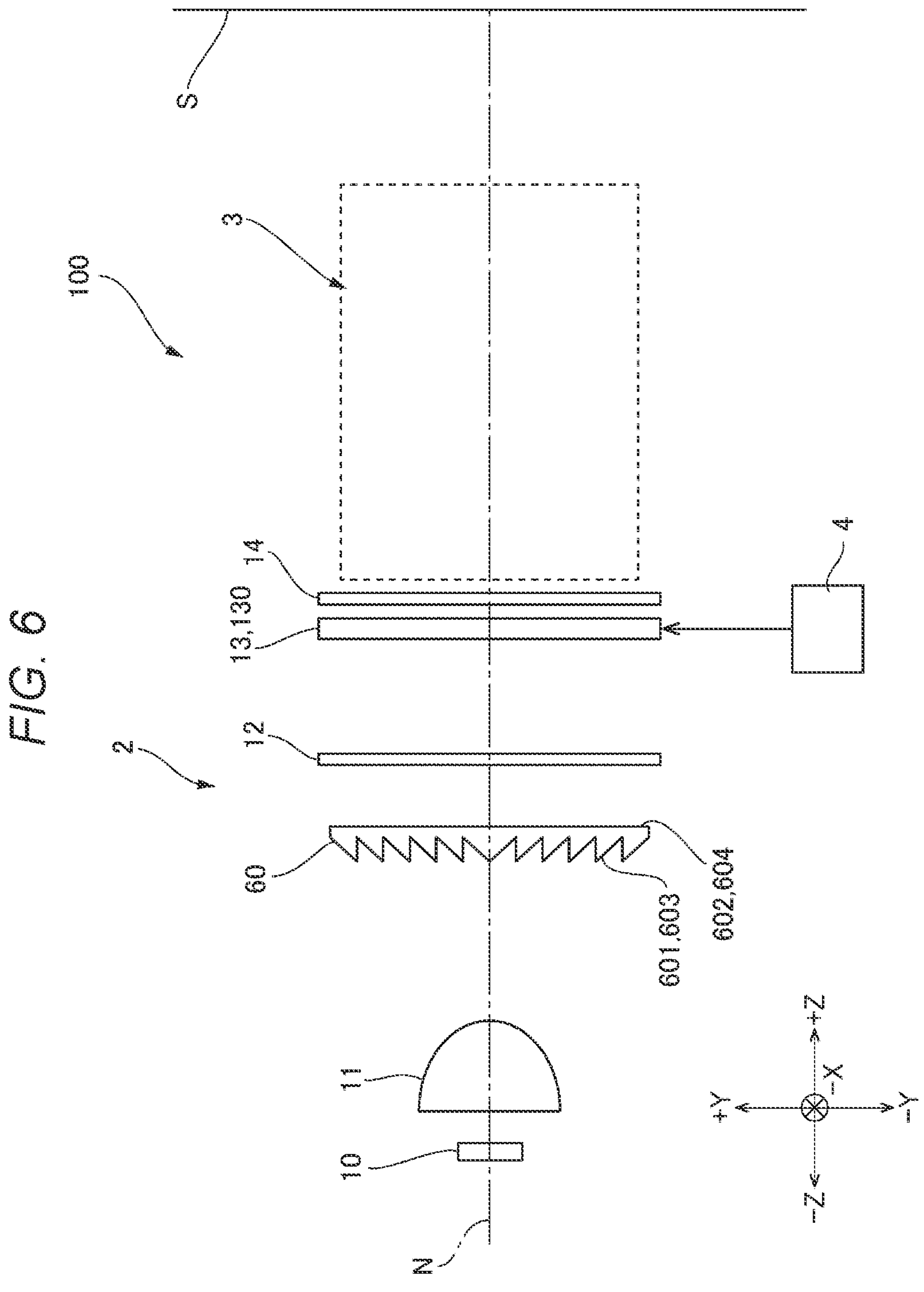
FIG. 6 is a schematic view of key parts of the projector according to Comparative Example.

FIG. 6 is a schematic view of key parts of a projector 100 according to Comparative Example. The projector 100 according to Comparative Example differs from the projector 1 according to Embodiment 1 in that one Fresnel lens 60 is provided. Therefore, in Comparative Example, the same configurations as those in Embodiment 1 have the same reference characters, and no description of the same configurations will be made in some cases. The Fresnel lens 60 has positive power. A light incident surface 601 of the Fresnel lens 60 has a Fresnel surface 603, as shown in FIG. 6. A light exiting surface 602 of the Fresnel lens 60 has a planar surface 604.

As a procedure for comparing Embodiment 1 with Comparative Example, the illuminance corresponding to each position in the beam distribution of the beam having exited out of the second Fresnel lens 22 of the Fresnel lens group 20 in Embodiments 1-1 to 1-3, and the illuminance corresponding to each position in the beam distribution of the beam having exited out of the Fresnel 60 in Comparative Example were each determined by using LightTools, followed by calculation of each evaluation value E by using the evaluation formula (1), and comparison among the evaluation values E.

Lens data on each of the Fresnel lenses in Embodiment 1 set by LightTools are shown below. Reference character D represents the axial inter-surface spacing.

Embodiment 1-1

| | | D | Material |
|---|---|---|---|
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

Embodiment 1-2

| | | D | Material |
|---|---|---|---|
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

| Embodiment 1-3 | | | |
|---|---|---|---|
| | | D | Material |
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

Data on the focal length of each of the Fresnel lenses in Embodiment 1 set by LightTools are shown below. Reference character f1 represents the focal length of the first Fresnel lens 21. Reference character f2 represents the focal length of the second Fresnel lens 22. Reference character f represents the combined focal length of the first Fresnel lens 21 and the second Fresnel lens 22.

| | Embodiment 1-1 | Embodiment 1-2 | Embodiment 1-3 |
|---|---|---|---|
| f1 | 230 mm | 297 mm | 420 mm |
| f2 | 420 mm | 297 mm | 230 mm |
| f | 150 mm | 150 mm | 150 mm |

Lens data on the Fresnel lens in Comparative Example set by LightTools are shown below. Reference character D represents the axial inter-surface spacing.

Comparative Example

| | | D | Material |
|---|---|---|---|
| Light source | | 150 mm | |
| Fresnel lens | First lens surface | 3 mm | P MMA |
| | Second lens surface | 17 mm | |
| Evaluation plane | Evaluation plane | — | — |

Data on the focal length of the Fresnel lens in Comparative Example set by LightTools are shown below. Reference character f0 represents the focal length of the Fresnel lens 60.

| Comparative Example | |
|---|---|
| f0 | 150 mm |

Other parameters in Embodiments 1-1 to 1-3 and Comparative Example set by LightTools are shown below.

| | |
|---|---|
| Facet Specification | Polynomial |
| Material | P MMA |
| Shape | Circular |
| Diameter | 150.0000 |
| Thickness | 3.0000 |
| Type | Equi-Depth |
| Maximum Depth | 0.0600 |
| Maximum Width | 0.5000 |
| Conic Constant | −1.0000 |

The tables below show illuminance corresponding to each position in the beam distribution of the beam having exited out of the second Fresnel lens 22 of the Fresnel lens group 20 in Embodiments 1-1 to 1-3 and illuminance corresponding to each position in the beam distribution of the beam having exited out of the Fresnel lens 60 in Comparative Example at the evaluation plane set by LightTools. Note that the evaluation plane is set at the same position in Embodiments 1-1 to 1-3 and Comparative Example.

| | Imax | Iap | Ibp | Icp | Idp |
|---|---|---|---|---|---|
| Embodiment 1-1 | 2.46563 | 1.42771 | 1.39707 | 1.69313 | 1.58696 |
| Embodiment 1-2 | 2.45517 | 1.44556 | 1.44164 | 1.58572 | 1.53631 |
| Embodiment 1-3 | 2.44752 | 1.40986 | 1.39033 | 1.60836 | 1.62436 |
| Comparative Example | 2.73768 | 1.27772 | 1.27498 | 1.54432 | 1.52027 |

| | Ias | Ibs | Ics | Ids |
|---|---|---|---|---|
| Embodiment 1-1 | 1.59364 | 1.56194 | 1.51682 | 1.42164 |
| Embodiment 1-2 | 1.60264 | 1.60051 | 1.43028 | 1.38575 |
| Embodiment 1-3 | 1.57067 | 1.55111 | 1.44367 | 1.45807 |
| Comparative Example | 1.52256 | 1.52335 | 1.29614 | 1.27588 |

The evaluation values E of the Fresnel lenses in Embodiments 1-1 to 1-3 and Comparative Example are shown below.

| | E |
|---|---|
| Embodiment 1-1 | 0.06818 |
| Embodiment 1-2 | 0.06333 |
| Embodiment 1-3 | 0.06666 |
| Comparative Example | 0.09002 |

The evaluation values E in Embodiments 1-1 to 1-3 are smaller than the evaluation value E in Comparative Example, as shown above. Therefore, when the focal length f of the Fresnel lens group 20 in Embodiments 1-1 to 1-3 and the focal length f0 of the Fresnel lens 60 in Comparative Example are set at the same value, the lens power of each of the Fresnel lenses in Embodiments 1-1 to 1-3 is smaller than the lens power of the Fresnel lens 60 in Comparative Example, and it is therefore found that the beam distribution of the beam having exited out of the second Fresnel lens 22 of the Fresnel lens group 20 in Embodiments 1-1 to 1-3 is smaller in terms of the amount of change in the shape of the beam distribution than the beam distribution of the beam having exited out of the Fresnel lens 60 in Comparative Example. That is, the beam distribution of the beam having exited out of the second Fresnel lens 22 of the Fresnel lens group 20 in Embodiments 1-1 to 1-3 is closer to a circular shape than the beam distribution of the beam having exited out of the Fresnel lens 60 in Comparative Example.

The beam distribution of the beam having exited out of the second Fresnel lens 22 of the Fresnel lens group 20 in Embodiment 1-2 out of Embodiment 1-1 to 1-3 is closest to a circular shape. That is, when the focal length of the first Fresnel lens 21 and the focal length of the second Fresnel lens 22 are equal to each other, the beam distribution of the beam having exited out of the Fresnel lens group 20 is closest to a circular shape.

Effects and Advantages

The projector 1 according to the present embodiment includes the light source 10, the Fresnel lens group 20, which parallelizes the beam output from the light source 10, the light-incident-side polarizer 12, which transmits the beam having exited out of the Fresnel lens group 20, the liquid crystal panel 130, which modulates the beam having passed through the light-incident-side polarizer 12 to form a projection image, the light-exiting-side polarizer 14, which transmits the beam modulated by the liquid crystal panel 130, and the projection lens 3, which projects the beam having passed through the light-exiting-side polarizer 14. The Fresnel lens group 20 includes a plurality of Fresnel lenses. The first Fresnel lens 21, which is disposed at a position closest to the light source 10 in the Fresnel lens group 20, has positive power. The light incident surface 211 of the first Fresnel lens 21 has the Fresnel surface 213. The light exiting surface 212 of the first Fresnel lens 21 does not have a Fresnel surface. The Fresnel lens group 20 includes the second Fresnel lens 22 disposed at a position shifted from the first Fresnel lens 21 toward the liquid crystal panel 130. The second Fresnel lens 22 has positive power. The light incident surface 221 of the second Fresnel lens 22 has the Fresnel surface 223. The light exiting surface 222 of the second Fresnel lens 22 does not have a Fresnel surface.

The present embodiment, in which the Fresnel lens group 20 includes two Fresnel lenses, allows a decrease in the lens power of each of the lenses as compared with the case where the lens group 20 includes one Fresnel lens. The change in the shape of the beam distribution of the beam having exited out of the second Fresnel lens 22 can thus be reduced. As a result, the beam distribution of the beam having exited out of the Fresnel lens group 20 has nearly a circular shape, so that the dark peripheral portion of the projection image formed by the liquid crystal panel 130 can be suppressed. The projector 1 can therefore project an enlarged image having uniform brightness.

In the present embodiment, the focal length of the first Fresnel lens 21 is equal to the focal length of the second Fresnel lens 22. The change in the shape of the beam distribution of the beam having exited out of the second Fresnel lens 22 can thus be further reduced. When the focal length of the first Fresnel lens 21 and the focal length of the second Fresnel lens 22 are set at the same value, the first Fresnel lens 21 and the second Fresnel lens 22 can have the same shape. The production cost of the Fresnel lenses can therefore be suppressed as compared with a case where the first Fresnel lens 21 and the second Fresnel lens 22 have different shapes.

The present embodiment, in which the lens power per lens can be reduced, can greatly suppress the decrease in transmittance of the Fresnel lens in the plane XY, such as that shown in FIG. 2, which transmits the light component polarized along the direction of the S-polarized light incident on the Fresnel lens. The dark peripheral portion of the projection image formed by the liquid crystal panel 130 can therefore be suppressed.

Embodiment 2

Figure 7:
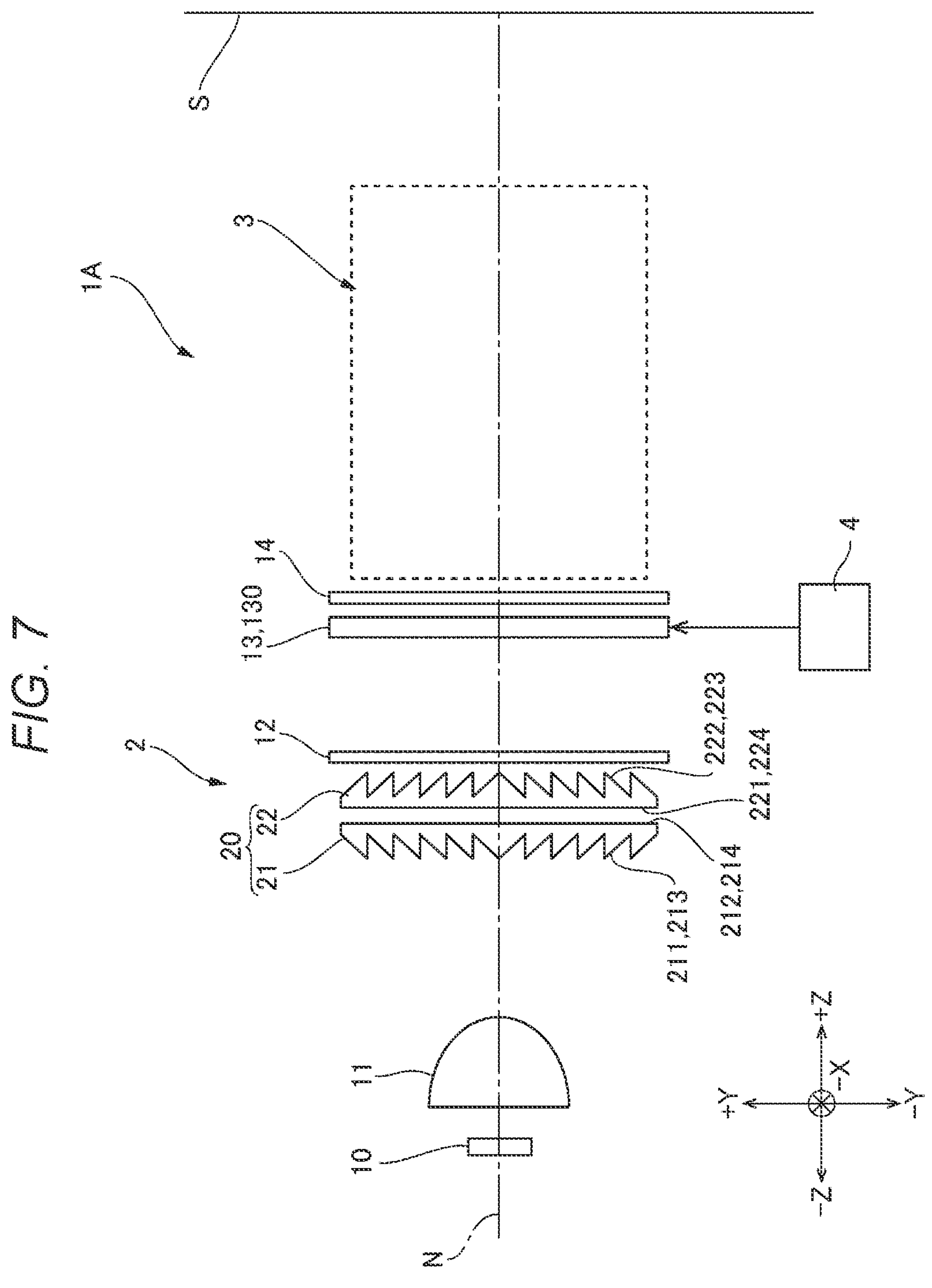
FIG. 7 is a schematic view of key parts of the projector according to Embodiment 2.

FIG. 7 is a schematic view of key parts of a projector 1A according to Embodiment 2. The projector 1A according to Embodiment 2 differs from the projector 1 according to Embodiment 1 in terms of the orientation of the Fresnel surface of the second Fresnel lens 22 of the Fresnel lens group 20. Therefore, in Embodiment 2, the same configurations as those in Embodiment 1 have the same reference characters, and no description of the same configurations will be made in some cases.

The Fresnel lens group 20 includes a plurality of Fresnel lenses, as shown in FIG. 7. In the present embodiment, the Fresnel lens group 20 includes the first Fresnel lens 21 disposed at the side facing the light source 10, and the second Fresnel lens 22 disposed at a position shifted from the first Fresnel lens 21 toward the liquid crystal panel 130.

The first Fresnel lens 21 is made of resin. The first Fresnel lens 21 has positive power. The light incident surface 211 of the first Fresnel lens 21 has the Fresnel surface 213. The light exiting surface 212 of the first Fresnel lens 21 has the planar surface 214. That is, the light exiting surface 212 of the first Fresnel lens 21 does not have a Fresnel surface.

The second Fresnel lens 22 is made of resin. The second Fresnel lens 22 has positive power. The light incident surface 221 of the second Fresnel lens 22 has the planar surface 224. That is, the light incident surface 221 of the second Fresnel lens 22 does not have a Fresnel surface. The light exiting surface 222 of the second Fresnel lens 22 has the Fresnel surface 223.

Comparison Between Embodiment 2 and Comparative Example

The beam distribution of the beam having exited out of the Fresnel lens group 20 in the projector 1A according to Embodiment 2 and the beam distribution of the beam having exited out of the Fresnel lens 60 in the projector 100 according to Comparative Example were compared with each the evaluation formula (1) described above, as in Embodiment 1.

Lens data on each of the Fresnel lenses in Embodiment 2 set by LightTools are shown below. Reference character D represents the axial inter-surface spacing.

Embodiment 2-1

| | | D | Material |
|---|---|---|---|
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

Embodiment 2-2

| | | D | Material |
|---|---|---|---|
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

Embodiment 2-3

| | | D | Material |
|---|---|---|---|
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 12 mm | |
| Evaluation plane | Evaluation plane | — | — |

Data on the focal length of each of the Fresnel lenses in Embodiment 2 set by LightTools are shown below. Reference character f1 represents the focal length of the first Fresnel lens 21. Reference character f2 represents the focal length of the second Fresnel lens 22. Reference character f represents the combined focal length of the first Fresnel lens 21 and the second Fresnel lens 22.

| | Embodiment 2-1 | Embodiment 2-2 | Embodiment 2-3 |
|---|---|---|---|
| f1 | 230 mm | 297 mm | 420 mm |
| f2 | 420 mm | 297 mm | 230 mm |
| f | 150 mm | 150 mm | 150 mm |

Lens data on the Fresnel lens in Comparative Example set by LightTools are shown below. Reference character D represents the axial inter-surface spacing.

Comparative Example

| | | D | Material |
|---|---|---|---|
| Light source | | 150 mm | |
| Fresnel lens | First lens surface | 3 mm | P MMA |
| | Second lens surface | 17 mm | |
| Evaluation plane | Evaluation plane | — | — |

Data on the focal length of the Fresnel lens in Comparative Example set by LightTools are shown below. Reference character f0 represents the focal length of the Fresnel lens 60.

| Comparative Example | |
|---|---|
| f0 | 150 mm |

Other parameters in Embodiments 2-1 to 2-3 and Comparative Example set by LightTools are the same as those in Embodiment 1.

The tables below show illuminance corresponding to each position in the beam distribution of the beam having exited out of the second Fresnel lens 22 of the Fresnel lens group 20 in Embodiments 2-1 to 2-3 and illuminance corresponding to each position in the beam distribution of the beam having exited out of the Fresnel lens 60 in Comparative Example at the evaluation plane set by LightTools. Note that the evaluation plane is set at the same position in Embodiments 2-1 to 2-3 and Comparative Example.

| | Imax | Iap | Ibp | Icp | Idp |
|---|---|---|---|---|---|
| Embodiment 2-1 | 2.45517 | 1.50644 | 1.44057 | 1.67737 | 1.64298 |
| Embodiment 2-2 | 2.43360 | 1.55627 | 1.54493 | 1.64206 | 1.67172 |
| Embodiment 2-3 | 2.40097 | 1.60863 | 1.57714 | 1.75837 | 1.7195 |
| Comparative Example | 2.73768 | 1.27772 | 1.27498 | 1.54432 | 1.52027 |

| | Ias | Ibs | Ics | Ids |
|---|---|---|---|---|
| Embodiment 2-1 | 1.67754 | 1.60678 | 1.50624 | 1.47541 |
| Embodiment 2-2 | 1.70729 | 1.69707 | 1.49681 | 1.52385 |
| Embodiment 2-3 | 1.75202 | 1.71964 | 1.61447 | 1.57874 |
| Comparative Example | 1.52256 | 1.52335 | 1.29614 | 1.27588 |

The evaluation values E of the Fresnel lenses in Embodiments 2-1 to 2-3 and Comparative Example are shown below.

| | E |
|---|---|
| Embodiment 2-1 | 0.06884 |
| Embodiment 2-2 | 0.06126 |
| Embodiment 2-3 | 0.05941 |
| Comparative Example | 0.09002 |

The evaluation values E in Embodiments 2-1 to 2-3 are smaller than the evaluation value E in Comparative Example, as shown above. Therefore, when the focal length f of the Fresnel lens group 20 in Embodiments 2-1 to 2-3 and the focal length f0 of the Fresnel lens 60 in Comparative Example are set at the same value, the lens power of each of the Fresnel lenses in Embodiments 2-1 to 2-3 is smaller than the lens power of the Fresnel lens 60 in Comparative Example, and it is therefore found that the beam distribution of the beam having exited out of the second Fresnel lens 22 of the Fresnel lens group 20 in Embodiments 2-1 to 2-3 is smaller in terms of the amount of change in the shape of the beam distribution than the beam distribution of the beam having exited out of the Fresnel lens 60 in Comparative Example. That is, the beam distribution of the beam having exited out of the second Fresnel lens 22 of the Fresnel lens group 20 in Embodiments 2-1 to 2-3 is closer to a circular shape than the beam distribution of the beam having exited out of the Fresnel lens 60 in Comparative Example.

The beam distribution of the beam having exited out of the second Fresnel lens 22 of the Fresnel lens group 20 in Embodiment 2-3 out of Embodiment 2-1 to 2-3 is closest to a circular shape. That is, when the focal length of the first Fresnel lens 21 is longer than the focal length of the second Fresnel lens 22, the beam distribution of the beam having exited out of the Fresnel lens group 20 is closest to a circular shape.

Effects and Advantages

The projector 1A according to the present embodiment, in which the Fresnel lens group 20 includes two Fresnel lenses, can provide the same effects as those provided by Embodiment 1. Furthermore, in the present embodiment, the light incident surface 221 of the second Fresnel lens 22 does not have a Fresnel surface. The light exiting surface 222 of the second Fresnel lens 22 has the Fresnel surface 223. Therefore, when compared with the Fresnel lens group 20 in Embodiment 1, in which the light incident surface 221 of the second Fresnel lens 22 has the Fresnel surface 223, the Fresnel lens group 20 in the present embodiment allows further reduction in the change in the shape of the beam distribution of the beam having exited out of the second Fresnel lens 22.

In the present embodiment, the focal length of the first Fresnel lens 21 is longer than the focal length of the second Fresnel lens 22. The change in the shape of the beam distribution of the beam having exited out of the second Fresnel lens 22 can thus be further reduced.

Embodiment 3

Figure 8:
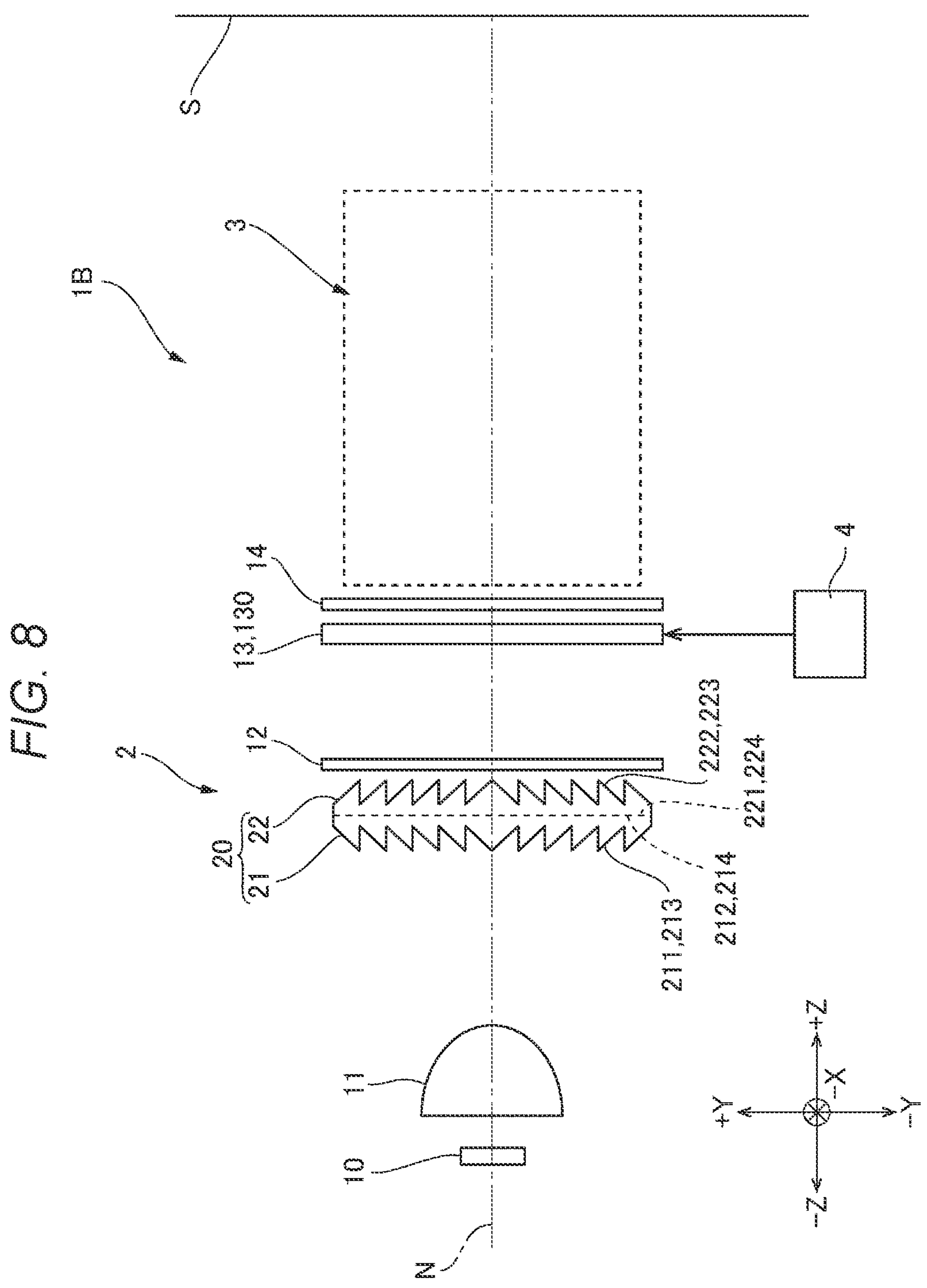
FIG. 8 is a schematic view of key parts of the projector according to Embodiment 3.

FIG. 8 is a schematic view of key parts of a projector 1B according to Embodiment 3. The projector 1B according to Embodiment 3 differs from the projector 1A according to Embodiment 2 in that the first Fresnel lens 21 and the second Fresnel lens 22 are integrated with each other into a single Fresnel lens. Therefore, in Embodiment 3, the same configurations as those in Embodiment 1 have the same reference characters, and no description of the same configurations will be made in some cases.

The first Fresnel lens 21 is made of resin. The first Fresnel lens 21 has positive power, as shown in FIG. 8. The light incident surface 211 of the first Fresnel lens 21 has the Fresnel surface 213. The light exiting surface 212 of the first Fresnel lens 21 has the planar surface 214. That is, the light exiting surface 212 of the first Fresnel lens 21 does not have a Fresnel surface.

The second Fresnel lens 22 is made of resin. The second Fresnel lens 22 has positive power. The light incident surface 221 of the second Fresnel lens 22 has the planar surface 224. That is, the light incident surface 221 of the second Fresnel lens 22 does not have a Fresnel surface. The light exiting surface 222 of the second Fresnel lens 22 has the Fresnel surface 223.

The first Fresnel lens 21 and the second Fresnel lens 22 are so integrated with each other into a single Fresnel lens that the light exiting surface 212 of the first Fresnel lens 21 is seamlessly coupled to the light incident surface 221 of the second Fresnel lens 22. In the present embodiment, the first Fresnel lens 21 and the second Fresnel lens 22 are formed in resin molding so as to form one member. Note that the light exiting surface 212 of the first Fresnel lens 21 and the light incident surface 221 of the second Fresnel lens 22 may be integrated with each other with an adhesive so as to be seamlessly coupled to each other.

Comparison Between Embodiment 3 and Comparative Example

The beam distribution of the beam having exited out of the Fresnel lens group 20 in the projector 1B according to Embodiment 3 and the beam distribution of the beam having exited out of the Fresnel lens 60 in the projector 100 according to Comparative Example were compared with each other by using the evaluation formula (1) described above, as in Embodiment 1.

Lens data on each of the Fresnel lenses in Embodiment 3 set by LightTools are shown below. Reference character D represents the axial inter-surface spacing.

Embodiment 3-1

| | | D | Material |
|---|---|---|---|
| Light source | | 150 mm | |
| First Fresnel lens | First lens surface | 3 mm | P MMA |
| Second Fresnel lens | Third lens surface | 3 mm | P MMA |
| | Fourth lens surface | 14 mm | |
| Evaluation plane | Evaluation plane | — | — |

Embodiment 3-2

| | | D | Material |
|---|---|---|---|
| Light source | | 150 mm | |
| First Fresnel lens | First lens surface | 3 mm | P MMA |
| Second Fresnel lens | Third lens surface | 3 mm | P MMA |
| | Fourth lens surface | 14 mm | |
| Evaluation plane | Evaluation plane | — | — |

Embodiment 3-3

| | | D | Material |
|---|---|---|---|
| Light source | | 150 mm | |
| First Fresnel lens | First lens surface | 3 mm | P MMA |
| Second Fresnel lens | Third lens surface | 3 mm | P MMA |
| | Fourth lens surface | 14 mm | |
| Evaluation plane | Evaluation plane | — | — |

Data on the focal length of each of the Fresnel lenses in Embodiment 3 set by LightTools are shown below. Reference character f1 represents the focal length of the first Fresnel lens 21. Reference character f2 represents the focal length of the second Fresnel lens 22. Reference character f represents the combined focal length of the first Fresnel lens 21 and the second Fresnel lens 22.

| | Embodiment 3-1 | Embodiment 3-2 | Embodiment 3-3 |
|---|---|---|---|
| f1 | 230 mm | 297 mm | 420 mm |
| f2 | 420 mm | 297 mm | 230 mm |
| f | 150 mm | 150 mm | 150 mm |

Lens data on the Fresnel lens in Comparative Example set by LightTools are shown below. Reference character D represents the axial inter-surface spacing.

Comparative Example

| | | D | Material |
|---|---|---|---|
| Light source | | 150 mm | |
| Fresnel lens | First lens surface | 3 mm | P MMA |
| | Second lens surface | 17 mm | |
| Evaluation plane | Evaluation plane | — | — |

Data on the focal length of the Fresnel lens in Comparative Example set by LightTools are shown below. Reference character f0 represents the focal length of the Fresnel lens 60.

| Comparative Example | |
|---|---|
| f0 | 150 mm |

Other parameters in Embodiments 3-1 to 3-3 and Comparative Example set by LightTools are the same as those in Embodiment 1.

The tables below show illuminance corresponding to each position in the beam distribution of the beam having exited out of the second Fresnel lens 22 of the Fresnel lens group 20 in Embodiments 3-1 to 3-3 and illuminance corresponding to each position in the beam distribution of the beam having exited out of the Fresnel lens 60 in Comparative Example at the evaluation plane set by LightTools. Note that the evaluation plane is set at the same position in Embodiments 3-1 to 3-3 and Comparative Example.

| | Imax | Iap | Ibp | Icp | Idp |
|---|---|---|---|---|---|
| Embodiment 3-1 | 2.46583 | 1.49093 | 1.44736 | 1.72068 | 1.65302 |
| Embodiment 3-2 | 2.45517 | 1.58642 | 1.54535 | 1.70319 | 1.65784 |
| Embodiment 3-3 | 2.44870 | 1.62341 | 1.62501 | 1.77806 | 1.77658 |
| Comparative Example | 2.73768 | 1.27772 | 1.27498 | 1.54432 | 1.52027 |

| | Ias | Ibs | Ics | Ids |
|---|---|---|---|---|
| Embodiment 3-1 | 1.66217 | 1.61625 | 1.54341 | 1.48268 |
| Embodiment 3-2 | 1.74230 | 1.69950 | 1.55079 | 1.50954 |
| Embodiment 3-3 | 1.76966 | 1.77353 | 1.63109 | 1.62975 |
| Comparative Example | 1.52256 | 1.52335 | 1.29614 | 1.27588 |

The evaluation values E of the Fresnel lenses in Embodiments 3-1 to 3-3 and Comparative Example are shown below.

| | E |
|---|---|
| Embodiment 3-1 | 0.06973 |
| Embodiment 3-2 | 0.06219 |
| Embodiment 3-3 | 0.06009 |
| Comparative Example | 0.09002 |

The evaluation values E in Embodiments 3-1 to 3-3 are smaller than the evaluation value E in Comparative Example, as shown above. Therefore, when the focal length f of the Fresnel lens group 20 in Embodiments 3-1 to 3-3 and the focal length f0 of the Fresnel lens 60 in Comparative Example are set at the same value, the lens power of each of the Fresnel lenses in Embodiments 3-1 to 3-3 is smaller than the lens power of the Fresnel lens 60 in Comparative Example, and it is therefore found that the beam distribution of the beam having exited out of the second Fresnel lens 22 of the Fresnel lens group 20 in Embodiments 3-1 to 3-3 is smaller in terms of the amount of change in the shape of the beam distribution than the beam distribution of the beam having exited out of the Fresnel lens 60 in Comparative Example. That is, the beam distribution of the beam having exited out of the second Fresnel lens 22 of the Fresnel lens group 20 in Embodiments 3-1 to 3-3 is closer to a circular shape than the beam distribution of the beam having exited out of the Fresnel lens 60 in Comparative Example.

The beam distribution of the beam having exited out of the second Fresnel lens 22 of the Fresnel lens group 20 in Embodiment 3-3 out of Embodiment 3-1 to 3-3 is closest to a circular shape. That is, when the focal length of the first Fresnel lens 21 is longer than the focal length of the second Fresnel lens 22, the beam distribution of the beam having exited out of the Fresnel lens group 20 is closest to a circular shape.

Effects and Advantages

The projector 1B according to the present embodiment, in which the Fresnel lens group 20 includes two Fresnel lenses, can provide the same effects as those provided by Embodiment 2.

In the present embodiment, the first Fresnel lens 21 and the second Fresnel lens 22 are so integrated with each other into a single Fresnel lens that the light exiting surface 212 of: the first Fresnel lens 21 is seamlessly coupled to the light incident surface 221 of the second Fresnel lens 22. The number of parts of the projector 1B can therefore be reduced because the first Fresnel lens 21 and the second Fresnel lens 22 are integrated with each other into a single Fresnel lens.

Embodiment 4

Figure 9:
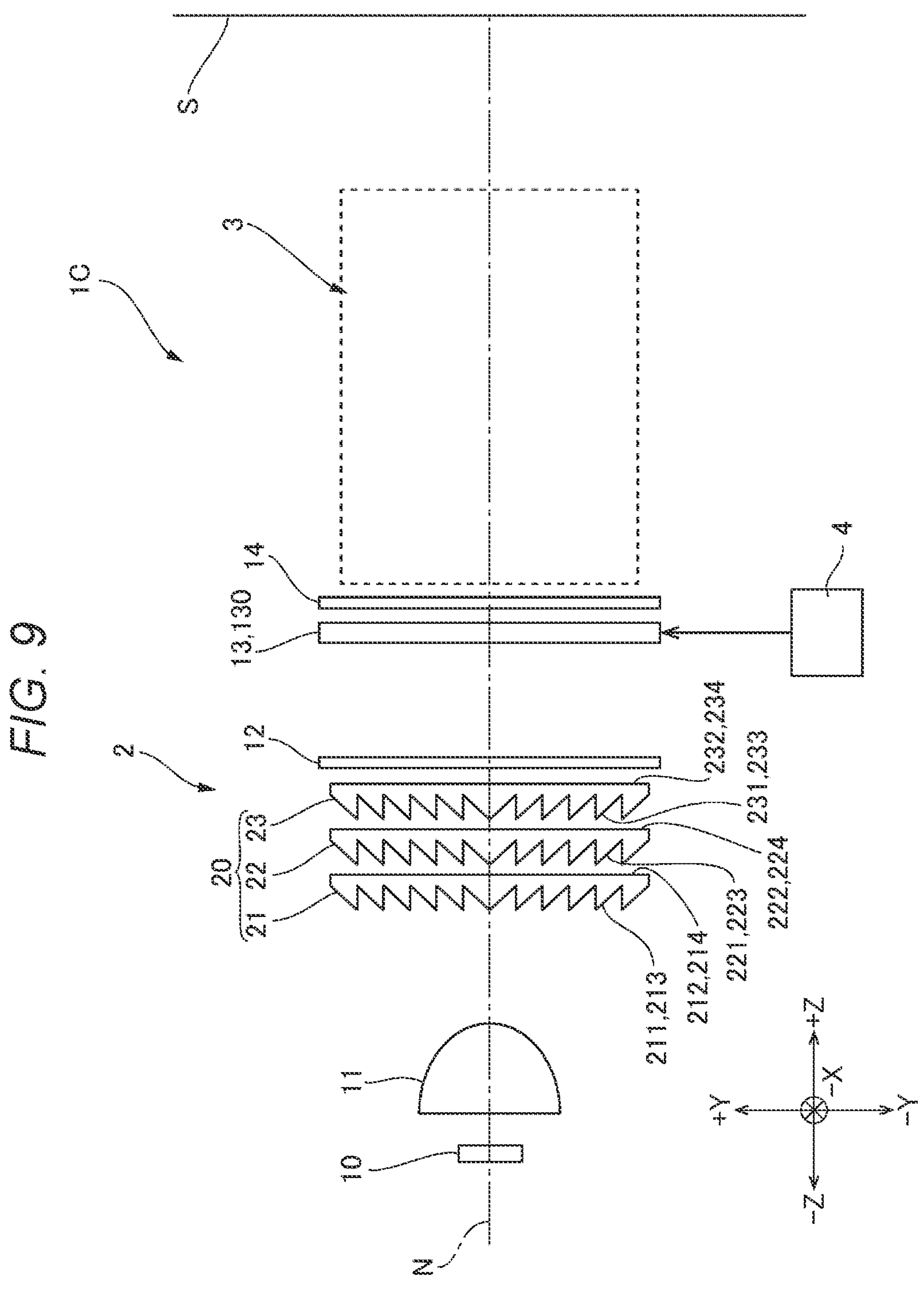
FIG. 9 is a schematic view of key parts of the projector according to Embodiment 4.

FIG. 9 is a schematic view of key parts of a projector 1C according to Embodiment 4. The projector 1C according to Embodiment 4 differs from the projector 1 according to Embodiment 1 in that the Fresnel lens group 20 includes three Fresnel lenses. Therefore, in Embodiment 4, the same configurations as those in Embodiment 1 have the same reference characters, and no description of the same configurations will be made in some cases.

The Fresnel lens group 20 includes the first Fresnel lens 21 disposed at the side facing the light source 10, the second Fresnel lens 22 disposed at a position shifted from the first Fresnel lens 21 toward the liquid crystal panel 130, and a third Fresnel lens 23 disposed at a position shifted from the second Fresnel lens 22 toward the liquid crystal panel 130, as shown in FIG. 9.

The first Fresnel lens 21 is made of resin. The first Fresnel lens 21 has positive power. The light incident surface 211 of the first Fresnel lens 21 has the Fresnel surface 213. The light exiting surface 212 of the first Fresnel lens 21 has the planar surface 214. That is, the light exiting surface 212 of the first Fresnel lens 21 does not have a Fresnel surface.

The second Fresnel lens 22 is made of resin. The second Fresnel lens 22 has positive power. The light incident surface 221 of the second Fresnel lens 22 has the Fresnel surface 223. The light exiting surface 222 of the second Fresnel lens 22 has the planar surface 224. That is, the light exiting surface 222 of the second Fresnel lens 22 does not have a Fresnel surface.

The third Fresnel lens 23 is made of resin. The third Fresnel lens 23 has positive power. A light incident surface 231 of the third Fresnel lens 23 has a Fresnel surface 233. A light exiting surface 232 of the third Fresnel lens 23 has a planar surface 234. That is, the light exiting surface 232 of the third Fresnel lens 23 does not have a Fresnel surface.

Comparison Between Embodiment 4 and Comparative Example

The beam distribution of the beam having exited out of the Fresnel lens group 20 in the projector 1C according to Embodiment 4 and the beam distribution of the beam having exited out of the Fresnel lens 60 in the projector 100 according to Comparative Example were compared with each other by using the evaluation formula (1) described above, as in Embodiment 1.

Lens data on each of the Fresnel lenses in Embodiment 4 set by LightTools are shown below. Reference character D represents the axial inter-surface spacing.

| Embodiment 4 | | | |
|---|---|---|---|
| | | D | Material |
| Light source | | 150 mm | |
| First Fresnel lens | First lens surface | 3 mm | P MMA |
| | Second lens surface | 2 mm | |
| Second Fresnel lens | Third lens surface | 3 mm | P MMA |
| | Fourth lens surface | 2 mm | |
| Third Fresnel lens | Fifth lens surface | 3 mm | P MMA |
| | Sixth lens surface | 7 mm | |
| Evaluation plane | Evaluation plane | — | — |

Data on the focal length of each of the Fresnel lenses in Embodiment 4 set by LightTools are shown below. Reference character f1 represents the focal length of the first Fresnel lens 21. Reference character f2 represents the focal length of the second Fresnel lens 22. Reference character f3 represents the focal length of the third Fresnel lens 23. Reference character f represents the combined focal length of the first Fresnel lens 21, the second Fresnel lens 22, and the third Fresnel lens 23.

| Embodiment 4 | |
|---|---|
| f1 | 450 mm |
| f2 | 450 mm |
| f3 | 450 mm |
| f | 150 mm |

Lens data on the Fresnel lens in Comparative Example set by LightTools are shown below. Reference character D represents the axial inter-surface spacing.

Comparative Example

| | | D | Material |
|---|---|---|---|
| Light source | | 150 mm | |
| Fresnel lens | First lens surface | 3 mm | P MMA |
| | Second lens surface | 17 mm | |
| Evaluation plane | Evaluation plane | — | |

Data on the focal length of the Fresnel lens in Comparative Example set by LightTools are shown below. Reference character f0 represents the focal length of the Fresnel lens 60.

| Comparative Example | |
|---|---|
| f0 | 150 mm |

Other parameters in Embodiment 4 and Comparative Example set by LightTools are the same as those in Embodiment 1.

The tables below show illuminance corresponding to each position in the beam distribution of the beam having exited out of the third Fresnel lens 23 of the Fresnel lens group 20 in Embodiment 4 and illuminance corresponding to each position in the beam distribution of the beam having exited out of the Fresnel lens 60 in Comparative Example at the evaluation plane set by LightTools. Note that the evaluation plane is set at the same position in Embodiment 4 and Comparative Example.

| | Imax | Iap | Ibp | Icp | Idp |
|---|---|---|---|---|---|
| Embodiment 4 | 2.19835 | 1.41153 | 1.33986 | 1.54533 | 1.48235 |
| Comparative Example | 2.73768 | 1.27772 | 1.27498 | 1.54432 | 1.52027 |

| | Ias | Ibs | Ics | Ids |
|---|---|---|---|---|
| Embodiment 4 | 1.53987 | 1.46329 | 1.41653 | 1.35883 |
| Comparative Example | 1.52256 | 1.52335 | 1.29614 | 1.27588 |

The evaluation values E of the Fresnel lenses in Embodiment 4 and Comparative Example are shown below.

| | E |
|---|---|
| Embodiment 4 | 0.05733 |
| Comparative Example | 0.09002 |

The evaluation value E in Embodiment 4 is smaller than the evaluation value E in Comparative Example, as shown above. Therefore, when the focal length f of the Fresnel lens group 20 in Embodiment 4 and the focal length f0 of the Fresnel lens 60 in Comparative Example are set at the same value, the lens power of each of the Fresnel lenses in Embodiment 4 is smaller than the lens power of the Fresnel lens 60 in Comparative Example, and it is therefore found that the beam distribution of the beam having exited out of the third Fresnel lens 23 of the Fresnel lens group 20 in Embodiment 4 is smaller in terms of the amount of change in the shape of the beam distribution than the beam distribution of the beam having exited out of the Fresnel lens 60 in Comparative Example. That is, the beam distribution of the beam having exited out of the third Fresnel lens 23 of the Fresnel lens group 20 in Embodiment 4 is closer to a circular shape than the beam distribution of the beam having exited out of the Fresnel lens 60 in Comparative Example.

Effects and Advantages

In the projector 1C according to the present embodiment, the Fresnel lens group 20 includes the third Fresnel lens 23 disposed at a position shifted from the second Fresnel lens 22 toward the light modulator 13. The third Fresnel lens 23 has positive power. The projector 1C according to the present embodiment, in which the Fresnel lens group 20 includes three Fresnel lenses, allows a further decrease in the lens power of each of the Fresnel lenses as compared with the case where the lens group 20 includes one Fresnel lens. As a result, the beam distribution of the beam having exited out of the Fresnel lens group 20 has a shape closer to a circular shape, so that the dark peripheral portion of the projection image formed by the liquid crystal panel 130 can be further suppressed.

Embodiment 5

Figure 10:
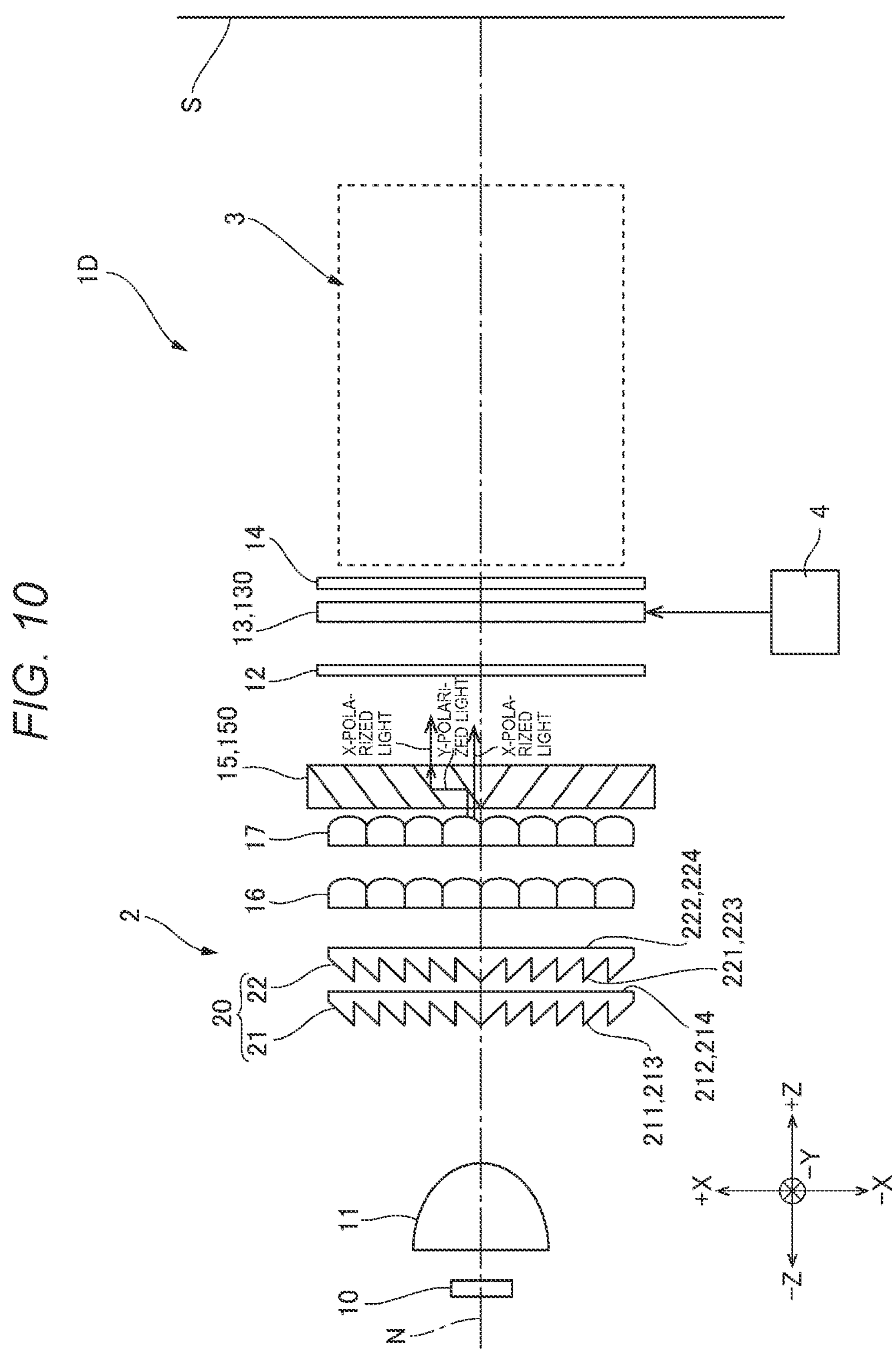
FIG. 10 is a schematic view of key parts of the projector according to Embodiment 5.

FIG. 10 is a schematic view of key parts of a projector 1D according to Embodiment 5. The projector 1D according to Embodiment 5 differs from the projector 1 according to Embodiment 1 in that the projector 1D includes a polarization conversion optical system. Therefore, in Embodiment 5, the same configurations as those in Embodiment 1 have the same reference characters, and no description of the same configurations will be made in some cases.

The image formation unit 2 includes the light source 10, the pickup lens 11, the Fresnel lens group 20, a first optical integration lens 16, optical integration lens 17, a polarization conversion optical system 15, the light-incident-side polarizer 12, the light modulator 13, and the light-exiting-side polarizer 14, as shown in FIG. 10.

The first optical integration lens 16 and the second optical integration lens 17 are disposed at the light exiting side of the Fresnel lens group 20. The first optical integration lens 16 and the second optical integration lens 17 each include a plurality of lens elements arranged in an array. The first optical integration lens 16 divides the beam from the Fresnel lens group 20 into a plurality of beams. The second optical integration lens 17 brings the beams from the first optical integration lens 16 into focus in the vicinity of the polarization conversion optical system 15.

The polarization conversion optical system 15 is disposed at the light exiting side of the second optical integration lens 17. The polarization conversion optical system 15 converts the polarization directions of the beam having exited out of the Fresnel lens group 20. The polarization conversion optical system 15 is a polarization converter 150. The polarization converter 150 is an optical element formed of a polarization beam splitter (PBS) array. The polarization converter 150 includes, although not shown, polarization separation layers that directly transmit one linearly polarized light component (X-polarized light, for example) out of the polarized light components contained in the beam having exited out of the Fresnel lens group 20 and reflect the other linearly polarized light component (Y-polarized light, for example) in a direction perpendicular to the optical axis, reflection layers that reflect the other linearly polarized light component reflected off the polarization separation layers in the direction parallel to the optical axis, and retardation films (half-wave films, for example) that convert the other linearly polarized light component (Y-polarized light, for example) reflected off the reflection layers into the one linearly polarized light component (X-polarized light, for example). The polarization converter 150 in the present embodiment converts the Y-polarized light out of the polarized light components contained in the beam incident thereon into the X-polarized light. More specifically, the polarization converter 150 transmits the X-polarized light out of the polarized light components contained in the beam incident on the polarization converter 150, converts the Y-polarized light into the X-polarized light, and outputs the converted X-polarized light toward the light-incident-side polarizer 12.

Effects and Advantages

The projector 1D according to the present embodiment includes the polarization conversion optical system 15, which is disposed between the Fresnel lens group 20 and the light-incident-side polarizer 12 and converts the polarization directions of the beam having exited out of the Fresnel lens group 20. The polarization conversion optical system 15 is the polarization converter 150. Therefore, as compared with the configuration without the polarization converter 150, the polarization converter 150 converts the Y-polarized light contained in the beam having exited out of the Fresnel lens group 20 into the X-polarized light that is used as the beam to be incident on the liquid crystal panel 130, so that the projector 1D according to the present embodiment allows an increase in the amount of beam incident on the liquid crystal panel 130. Note that the polarization conversion optical system 15 in the present embodiment can be used in Embodiments 1 to 4.

Embodiment 6

Figure 11:
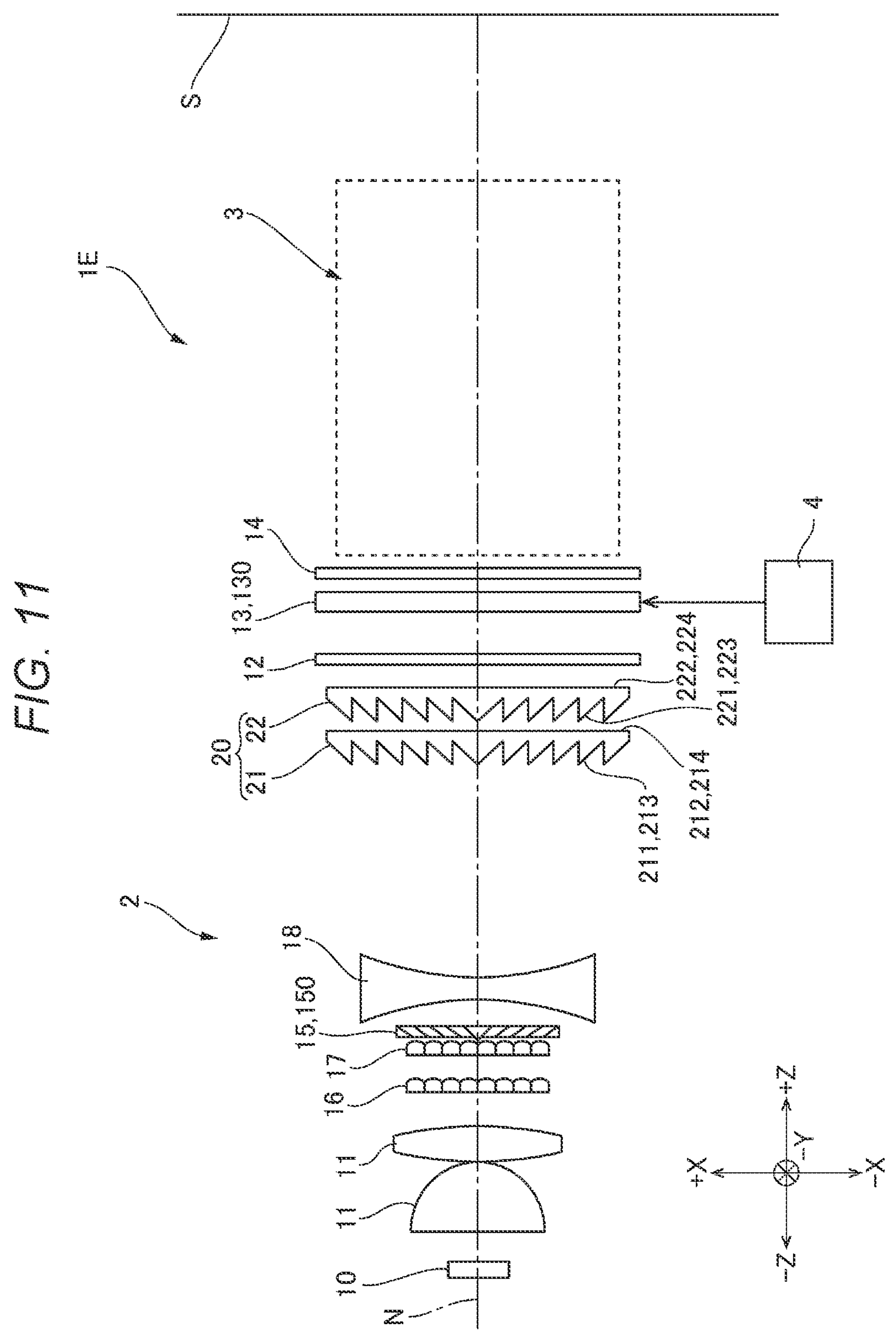
FIG. 11 is a schematic view of key parts of the projector according to Embodiment 6.

FIG. 11 is a schematic view of key parts of a projector 1E according to Embodiment 6. The projector 1E according to Embodiment 6 differs from the projector 1D according to Embodiment 5 in that the position where the polarization conversion optical system is disposed in a different position. Therefore, in Embodiment 6, the same configurations as those in Embodiment 1 have the same reference characters, and no description of the same configurations will be made in some cases.

The image formation unit 2 includes the light source 10, the pickup lens 11, the first optical integration lens 16, the second optical integration lens 17, the polarization conversion optical system 15, an enlarging lens 18, the Fresnel lens group 20, the light-incident-side polarizer 12, the light modulator 13, and the light-exiting-side polarizer 14, as shown in FIG. 11.

The first optical integration lens 16 and the second optical integration lens 17 are disposed at the light exiting side of the pickup lens 11. The first optical integration lens 16 and the second optical integration lens 17 each include a plurality of lens elements arranged in an array. The first optical integration lens 16 divides the beam from the pickup lens 11 into a plurality of beams. The second optical integration lens 17 brings the beams from the first optical integration lens 16 into focus in the vicinity of the polarization conversion optical system 15.

The polarization conversion optical system 15 is disposed at the light exiting side of the second optical integration lens 17. The polarization conversion optical system 15 converts the polarization directions of the beam output from the light source 10. The polarization conversion optical system 15 is the polarization converter 150. The polarization converter 150 in the present embodiment transmits the X-polarized light out of the polarized light components contained in the beam incident on the polarization converter 150, converts the Y-polarized light into the X-polarized light, and outputs the converted X-polarized light toward the light-incident-side polarizer 12. The enlarging lens 18 enlarges the beam incident from the polarization converter 150 and outputs the enlarged beam toward the light-incident-side polarizer 12.

Effects and Advantages

The projector 1E according to the present embodiment includes the polarization conversion optical system 15, which is disposed between the light source 10 and the Fresnel lens group 20 and converts the polarization directions of the beam output from the light source 10. The polarization conversion optical system 15 is the polarization converter 150. Therefore, as compared with the configuration without the polarization converter 150, the polarization conversion optical system 15 converts the Y-polarized light contained in the beam output from the light source 10 into the X-polarized light that is used as the beam to be incident on the liquid crystal panel 130, so that the projector 1E according to the present embodiment allows an increase in the amount of the beam incident on the liquid crystal panel 130. Note that the polarization conversion optical system 15 in the present embodiment can be used in Embodiments 1 to 4.

Embodiment 7

Figure 12:
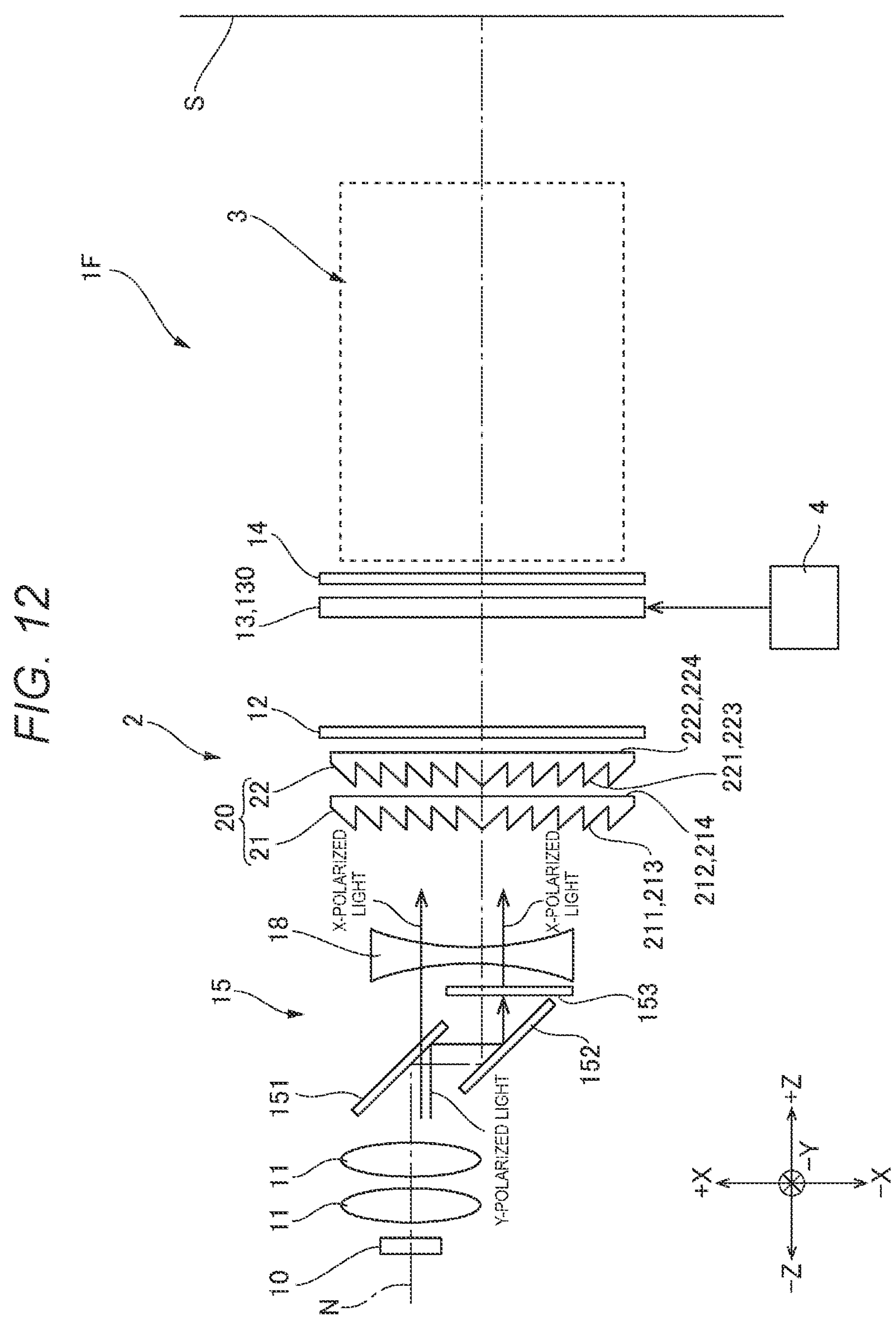
FIG. 12 is a schematic view of key parts of the projector according to Embodiment 7.

FIG. 12 is a schematic view of key parts of a projector 1F according to Embodiment 7. The projector 1F according to Embodiment 7 differs from the projector 1E according to Embodiment 6 in that the polarization conversion optical system is not a polarization converter. Therefore, in Embodiment 7, the same configurations as those in Embodiment 1 have the same reference characters, and no description of the same configurations will be made in some cases.

The image formation unit 2 includes the light source 10, the pickup lens 11, the polarization conversion optical system 15, the enlarging lens 18, the Fresnel lens group 20, the light-incident-side polarizer 12, the light modulator 13, and the light-exiting-side polarizer 14, as shown in FIG. 12.

The polarization conversion optical system 15 is disposed at the light exiting side of the pickup lens 11. The polarization conversion optical system 15 converts the polarization directions of the beam output from the light source 10. More specifically, the polarization conversion optical system 15 converts the Y-polarized light out of the polarized light components contained in the beam incident on the polarization conversion optical system 15 into the X-polarized light. The polarization conversion optical system 15 includes a polarization beam splitter 151, a total reflection mirror 152, and a retardation film 153. The polarization beam splitter 151 directly transmits one linearly polarized light component (X-polarized light, for example) out of the polarized light components contained in the beam incident thereon, and reflects the other linearly polarized light component (Y-polarized light, for example) in a direction perpendicular to the optical axis N. In the present embodiment, the polarization beam splitter 151 transmits the X-polarized light toward the enlarging lens 18 and reflects the Y-polarized light toward the total reflection mirror 152. The total reflection mirror 152 reflects the Y-polarized light reflected off the polarization beam splitter 151 in the direction parallel to the optical axis N. The retardation film 153 (half-wave film, for example) converts the Y-polarized light reflected off the total reflection mirror 152 into the X-polarized light and outputs the converted X-polarized light toward the enlarging lens 18. The enlarging lens 18 enlarges the beam incident from the polarization conversion optical system 15 and outputs the enlarged beam toward the light-incident-side polarizer 12.

Effects and Advantages

The projector 1F according to the present embodiment includes the polarization conversion optical system 15, which is disposed between the light source 10 and the Fresnel lens group 20 and converts the polarization directions of the beam output from the light source 10. The polarization conversion optical system 15 includes the polarization beam splitter 151, which directly transmits the X-polarized light out of the polarized light components contained in the beam incident thereon, and reflects the Y-polarized light, which is the other linearly polarized light component, in a direction perpendicular to the optical axis N, the total reflection mirror 152, which reflects the Y-polarized light reflected off the polarization beam splitter 151 in the direction parallel to the optical axis N, and the retardation film 153, which converts the Y-polarized light reflected off the total reflection mirror 152 into the X-polarized light. Therefore, the polarization conversion optical system 15 converts the Y-polarized light contained in the beam output from the light source 10 into the X-polarized light that is used as the beam to be incident on the liquid crystal panel 130, so that the projector 1G according to the present embodiment allows an increase in the amount of the beam incident on the liquid crystal panel 130. Note that the polarization conversion optical system 15 in the present embodiment can be used in Embodiments 1 to 4.

Embodiment 8

Figure 13:
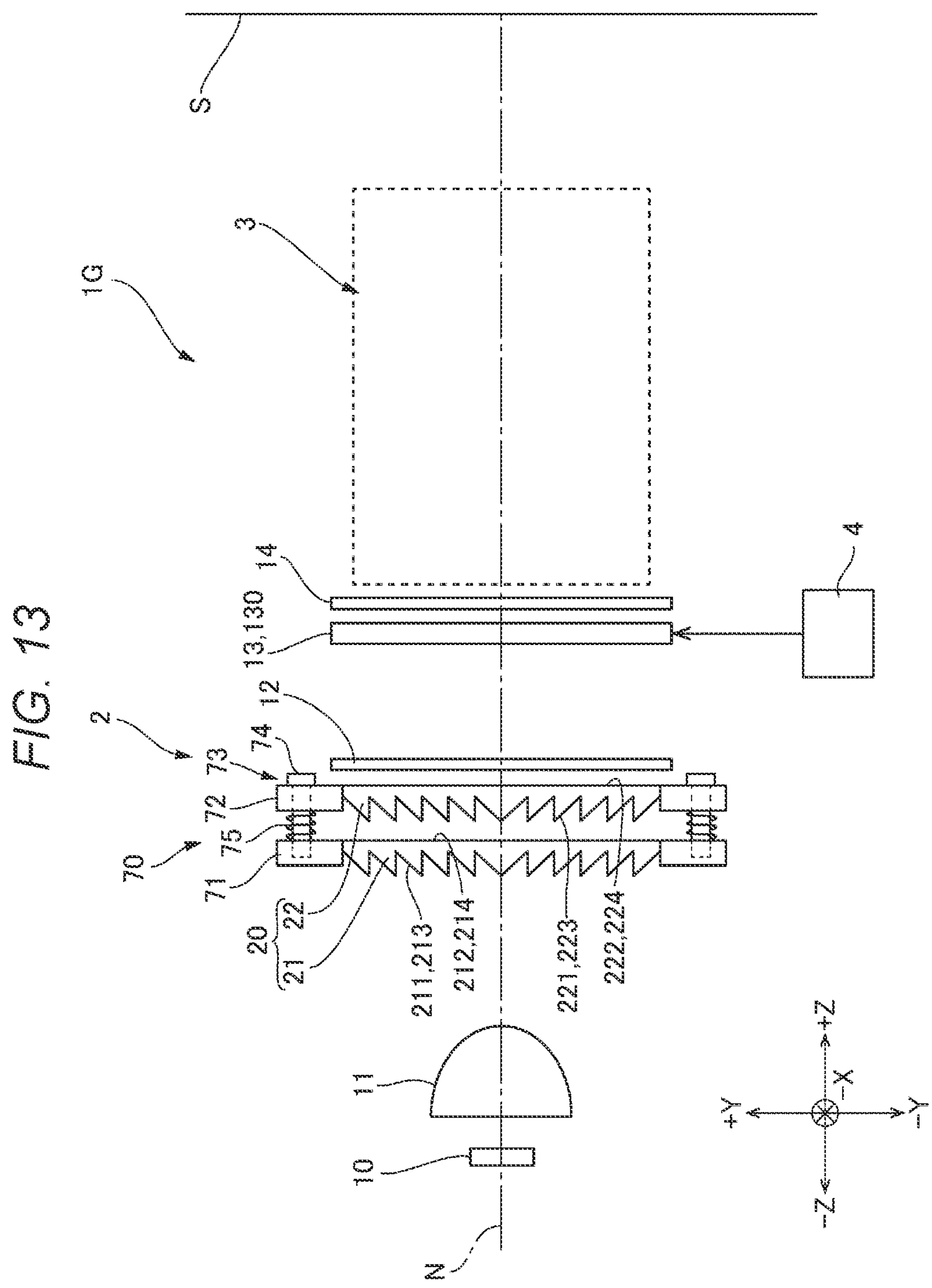
FIG. 13 is a schematic view of key parts of the projector according to Embodiment 8.
Figure 14:
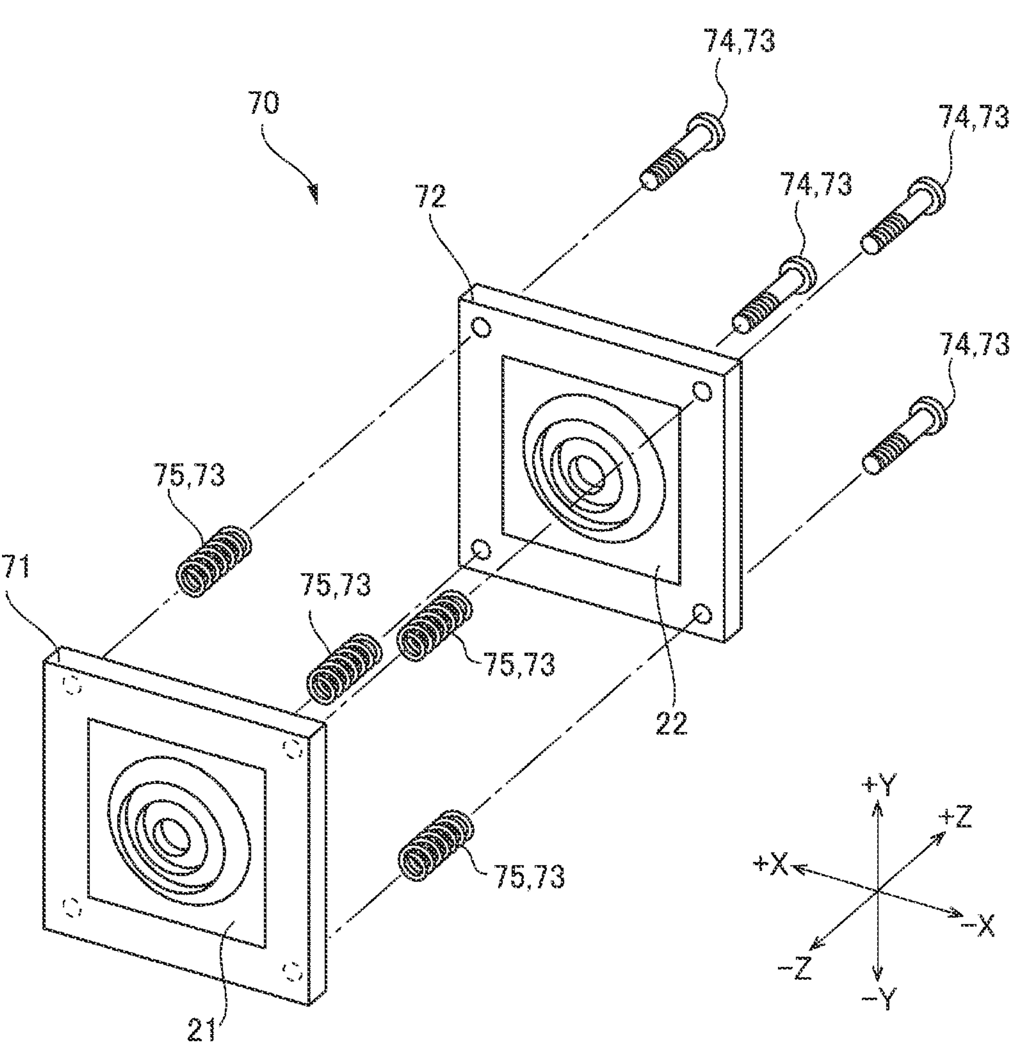
FIG. 14 is an exploded perspective view of an adjustment mechanism.

FIG. 13 is a schematic view of key parts of a projector 1G according to Embodiment 8. FIG. 14 is an exploded perspective view of an adjustment mechanism. The projector 1G according to Embodiment 8 differs from the projector 1 according to Embodiment 1 in that the projector 1G includes an adjustment mechanism 70. Therefore, in Embodiment 8, the same configurations as those in Embodiment 1 have the same reference characters, and no description of the same configurations will be made in some cases.

The image formation unit 2 includes the light source 10, the pickup lens 11, the Fresnel lens group 20, the light-incident-side polarizer 12, the light modulator 13, the light-exiting-side polarizer 14, and the adjustment mechanism 70, as shown in FIG. 13. The adjustment mechanism 70 changes the axial distance between the first Fresnel lens 21 and the second Fresnel lens 22.

The adjustment mechanism 70 includes a first frame 71, which holds the first Fresnel lens 21, a second frame 72, which holds the second Fresnel lens 22, and an adjuster 73, which adjusts the distance between the first frame 71 and the second frame 72, as shown in FIGS. 13 and 14. The first frame 71 holds an outer circumferential portion of the first Fresnel lens 21. The first frame 71 is fixed to a body or any other portion of the projector 1G. The second frame 72 holds an outer circumferential portion of the second Fresnel lens 22. The second frame 72 is fixed to the first frame 71. The adjuster 73 includes adjustment screws 74, which fix the second frame 72 to the first frame 71, and springs 75, which are disposed between the first frame 71 and the second frame 72 and through which adjustment screws 74 are inserted. In the present embodiment, the number of adjustment screws 74 and springs 75 is four. The adjustment screws 74 are inserted through holes provided in the second frame 72 and screwed into screw holes provided in the first frame 71. The distance between the first frame 71 and the second frame 72 is adjusted by rotating the adjustment screws 74. In this process, the springs 75 apply an urging force to the first frame 71 and the second frame 72.

Effects and Advantages

The projector 1G according to the present embodiment includes the adjustment mechanism 70, which changes the axial distance between the first Fresnel lens 21 and the second Fresnel lens 22. The distance between the first Fresnel lens 21 and the second Fresnel lens 22 is therefore readily adjusted when the projector 1G is manufactured. Note that the adjustment mechanism 70 can be used in Embodiments 1, 2, and 4 to 7.

Other Embodiments

In the embodiments described above, the projector includes the light modulator 13 formed of the single liquid crystal panel 130, and the light modulator 13 is not limited to the single liquid crystal panel 130. For example, the light modulator 13 may be formed of three liquid crystal panels that modulate red light, blue light, and green light, respectively. That is, the projector may employ a three-panel scheme.

The adjustment mechanism 70 does not necessarily have the configuration described above. The adjustment mechanism 70 only needs to have a configuration that can change the axial distance between the first Fresnel lens 21 and the second Fresnel lens 22.

It is preferable that the first Fresnel lens 21 and the second Fresnel lens 22 are disposed in succession. It is further preferable that the first Fresnel lens 21, the second Fresnel lens 22, and the third Fresnel lens 23 are disposed in succession. The size of the Fresnel lens group 20 can thus be reduced.

It is preferable that the maximum effective lens width of the Fresnel lens disposed at a position closest to the light modulator 13 in the Fresnel lens group 20 (second Fresnel lens 22 in the case of two Fresnel lenses, third Fresnel lens 23 in the case of three Fresnel lenses) is greater than or equal to the maximum width of the effective display surface of the liquid crystal panel 130 (diagonal in the case where effective display surface has rectangular shape). The parallelized beam from the Fresnel lens group 20 can thus be more reliably incident on the entire effective display surface of the liquid crystal panel 130.

SUMMARY OF PRESENT DISCLOSURE

The present disclosure will be summarized below as additional remarks.

Additional Remark 1

A projector including a light source, a Fresnel lens group that parallelizes a beam output from the light source, a light-incident-side polarizer that transmits the beam that exits out of the Fresnel lens group, a light modulator that modulates the beam passing through the light-incident-side polarizer to form a projection image, a light-exiting-side polarizer that transmits the beam modulated by the light modulator, and a projection lens that projects the beam passing through the light-exiting-side polarizer, the Fresnel lens group including a first Fresnel lens having positive power and disposed at a position closest to the light source in the Fresnel lens group, and a second Fresnel lens having positive power and disposed at a position shifted from the first Fresnel lens toward the light modulator, the light incident surface of the first Fresnel lens having a Fresnel surface, and the light exiting surface of the first Fresnel lens not having a Fresnel surface.

The configuration described above, in which the first and second Fresnel lenses each have positive power, allows a decrease in the lens power of each of the lenses of the Fresnel lens group as compared with the case where the Fresnel lens group includes only one Fresnel lens having positive power. The change in the shape of the beam distribution of the beam having exited out of the Fresnel lens group can thus be reduced. As a result, since the beam distribution of the beam having exited out of the Fresnel lens group has nearly a circular shape, the dark peripheral portion of the projection image formed by the light modulator can be suppressed. The projector can therefore project an enlarged image having uniform brightness.

Additional Remark 2

The projector described in the additional remark 1, in which the light incident surface of the second Fresnel lens has a Fresnel surface, and the light exiting surface of the second Fresnel lens does not have a Fresnel surface.

The second Fresnel lens therefore has positive power, so that the lens power can be achieved by cooperation between the first Fresnel lens and the second Fresnel lens.

Additional Remark 3

The projector described in the additional remark 2, in which the focal length of the first Fresnel lens is equal to the focal length of the second Fresnel lens.

The change in the shape of the beam distribution of the beam having exited out of the second Fresnel lens can thus be further reduced. When the focal length of the first Fresnel lens and the focal length of the second Fresnel lens are set at the same value, the first Fresnel lens and the second Fresnel lens can have the same shape. The production cost of the Fresnel lenses can therefore be suppressed as compared with a case where the first Fresnel lens and the second Fresnel lens have different shapes.

Additional Remark 4

The projector described in the additional remark 1, in which the light incident surface of the second Fresnel lens does not have a Fresnel surface, and the light exiting surface of the second Fresnel lens has a Fresnel surface.

Therefore, when compared with the Fresnel lens group in which the light incident surface of the second Fresnel lens has a Fresnel surface, the Fresnel lens group in the additional remark 4 allows further reduction in the change in the shape of the beam distribution of the beam having exited out of the second Fresnel lens.

Additional Remark 5

The projector described in the additional remark 4, in which the focal length of the first Fresnel lens is longer than the focal length of the second Fresnel lens.

The change in the shape of the beam distribution of the beam having exited out of the second Fresnel lens can thus be further reduced.

Additional Remark 6

The projector described in the additional remark 4 or 5, in which the first Fresnel lens and the second Fresnel lens are so integrated with each other into a single Fresnel lens that the light exiting surface of the first Fresnel lens is seamlessly coupled to the light incident surface of the second Fresnel lens.

The first Fresnel lens and the second Fresnel lens are therefore integrated with each other into a single Fresnel lens, so that the number of parts of the projector can be reduced.

Additional Remark 7

The projector described in any one of the additional remarks 2 to 5, further including an adjustment mechanism that changes the axial distance between the first Fresnel lens and the second Fresnel lens.

The axial distance between the first Fresnel lens and the second Fresnel lens is therefore readily adjusted when the projector is manufactured.

Additional Remark 8

The projector described in any one of the additional remarks 2 to 7, in which the Fresnel lens group includes a third Fresnel lens disposed at a position shifted from the second Fresnel lens toward the light modulator, and the third Fresnel lens has positive power.

The configuration described above, in which the Fresnel lens group includes three Fresnel lenses, allows a further decrease in the lens power of each of the Fresnel lenses as compared with the case where the Fresnel lens group includes one Fresnel lens. As a result, the beam distribution of the beam having exited out of the Fresnel lens group has a shape closer to a circular shape, so that the dark peripheral portion of the projection image formed by the light modulator can be further suppressed.

Additional Remark 9

The projector described in any one of the additional remarks 1 to 8, further including a polarization conversion optical system that is disposed between the light source and the Fresnel lens group and converts the polarization directions of the beam output from the light source.

The polarization conversion optical system thus converts the polarization directions of the beam output from the light source, so that the projector according to the present embodiment allows an increase in the amount of beam incident on the light modulator, as compared with the configuration without the polarization conversion optical system.

Additional Remark 10

The projector described in any one of the additional remarks 1 to 8, further including a polarization conversion optical system that is disposed between the Fresnel lens group and the light-incident-side polarizer and converts the polarization directions of the beam that exits out of the Fresnel lens group.

The polarization conversion optical system thus converts the polarization directions of the beam having exited out of the Fresnel lens group, so that the projector according to the present embodiment allows an increase in the amount of beam incident on the light modulator, as compared with the configuration without the polarization conversion optical system.

Additional Remark 11

The projector described in the additional remark 9, in which the polarization conversion optical system includes a polarization beam splitter that directly transmits one linearly polarized light component out of the polarized light components contained in the beam incident thereon and reflects the other linearly polarized light component in a direction perpendicular to the optical axis, a total reflection mirror that reflects the other linearly polarized light component reflected off the polarization beam splitter in the direction parallel to the optical axis, and a retardation film that converts the other linearly polarized light component reflected off the total reflection mirror into the one linearly polarized light component.

What is claimed is:

1. A projector comprising:

a light source;

a Fresnel lens group that parallelizes a beam output from the light source;

a light-incident-side polarizer that transmits the beam that exits out of the Fresnel lens group;

a light modulator that modulates the beam passing through the light-incident-side polarizer to form a projection image;

a light-exiting-side polarizer that transmits the beam modulated by the light modulator; and a projection lens that projects the beam passing through the light-exiting-side polarizer, wherein the Fresnel lens group includes a first Fresnel lens having positive power and disposed at a position closest to the light source in the Fresnel lens group, and a second Fresnel lens having positive power and disposed at a position shifted from the first Fresnel lens toward the light modulator, a light incident surface of the first Fresnel lens has a Fresnel surface, a light exiting surface of the first Fresnel lens does not have a Fresnel surface, and an adjustment mechanism that changes an axial distance between the first Fresnel lens and the second Fresnel lens, wherein the adjustment mechanism comprises:

a first frame holding the first Fresnel lens, a second frame holding the second Fresnel lens, an adjustment screw inserted between the first frame and the second frame, and at least one spring disposed around the adjustment screw, the adjustment mechanism changes an axial distance between the first Fresnel lens and the second Fresnel lens by adjusting the adjustment screw.

2. The projector according to claim 1, wherein a light incident surface of the second Fresnel lens has a Fresnel surface, and a light exiting surface of the second Fresnel lens does not have a Fresnel surface.

3. The projector according to claim 2, wherein a focal length of the first Fresnel lens is equal to a focal length of the second Fresnel lens.

4. The projector according to claim 1, wherein a light incident surface of the second Fresnel lens does not have a Fresnel surface, and a light exiting surface of the second Fresnel lens has a Fresnel surface.

5. The projector according to claim 4, wherein a focal length of the first Fresnel lens is longer than a focal length of the second Fresnel lens.

6. The projector according to claim 2, wherein the Fresnel lens group includes a third Fresnel lens disposed at a position shifted from the second Fresnel lens toward the light modulator, and the third Fresnel lens has positive power.

7. The projector according to claim 1, further comprising a polarization conversion optical system that is disposed between the light source and the Fresnel lens group and converts polarization directions of the beam output from the light source.

8. The projector according to claim 1, further comprising a polarization conversion optical system that is disposed between the Fresnel lens group and the light-incident-side polarizer and converts polarization directions of the beam that exits out of the Fresnel lens group.

9. The projector according to claim 7, wherein the polarization conversion optical system includes a polarization beam splitter that directly transmits one linearly polarized light component out of polarized light components contained in the beam incident thereon and reflects another linearly polarized light component in a direction perpendicular to an optical axis, a total reflection mirror that reflects the other linearly polarized light component reflected off the polarization beam splitter in a direction parallel to the optical axis, and a retardation film that converts the other linearly polarized light component reflected off the total reflection mirror into the one linearly polarized light component.

10. The projector according to claim 1, wherein a focal length of the first Fresnel lens comprises at least one of 230 mm, 297 mm, 420 mm, and 450 mm.

11. The projector according to claim 1, wherein an axial inter-surface spacing of a first lens surface of the first Fresnel comprises 3 mm.

12. The projector according to claim 1, wherein an axial inter-surface spacing of a second lens surface of the first Fresnel comprises 2 mm.

13. The projector according to claim 1, wherein an axial inter-surface spacing of a third lens surface of the second Fresnel lens comprises 3 mm.

14. The projector according to claim 1, wherein an axial inter-surface spacing of a fourth lens surface of the second Fresnel lens comprises at least one of 2 mm, 12 mm, and 14 mm.

* * * * *